(12) United States Patent
Imaizumi et al.

(10) Patent No.: US 6,928,103 B2
(45) Date of Patent: Aug. 9, 2005

(54) RACH RECEIVING APPARATUS

(75) Inventors: Ichiro Imaizumi, Tokyo (JP); Jun Watanabe, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 854 days.

(21) Appl. No.: 09/837,415

(22) Filed: Apr. 19, 2001

(65) Prior Publication Data

US 2002/0048316 A1 Apr. 25, 2002

(30) Foreign Application Priority Data

Oct. 23, 2000 (JP) ....................... 2000-322966

(51) Int. Cl.[7] .............................................. H04B 1/707
(52) U.S. Cl. ....................................................... 375/142
(58) Field of Search ................................ 375/142, 144, 375/147, 150, 152

(56) References Cited

U.S. PATENT DOCUMENTS 6,724,806 B2 * 4/2004 Okumura et al. ........... 375/142

FOREIGN PATENT DOCUMENTS

JP 9-200179 7/1997

* cited by examiner

Primary Examiner—Stephen Chin
Assistant Examiner—Kevin Kim
(74) Attorney, Agent, or Firm—Jacobson Holman PLLC

(57) ABSTRACT

The present invention provides an RACH receiving apparatus in which the components can be constructed in a small scale.

The RACH receiving apparatus performs a demodulation processing so as to divide it into two stages of a first demodulation processing for multiplying reception data of complex-modulated RACH by sign codes subjected to an arithmetic processing with long codes and phase rotations in a code register multiplying unit, and a second demodulation processing for adding multiplication results every chips and multiplying addition results by signature codes in a signature multiplying unit.

9 Claims, 11 Drawing Sheets

RACH RECEIVING APPARATUS

BACKGROUND OF THE INVENTION (i) Field of the Invention

The present invention relates to a correlation circuit for spread spectrum communication used on a receiver side of a spread spectrum communication system in mobile communication or wireless LAN and, more particularly, to an RACH receiving apparatus for detecting an RACH with a simple and small construction.

(ii) Description of the Related Art

Generally, in a spread spectrum (SS) communication system used in mobile communication or wireless LAN (Local Area Network), on a transmission side, transmission data is subjected to a narrow band modulation (primary modulation) and further subjected to a spreading modulation (secondary modulation), namely, data is subjected to a two-stage modulation and then transmitted.

On a reception side, reception data is despread to be returned in the primary modulated state and a normal detecting circuit reconstructs a baseband signal.

According to a modulation system for a Preamble part regarding an RACH determined by 3GPP for W-CDMA, however, transmission data whose data rate is always constant is modulated with a kind of long code determined every sector and four kinds of phase rotations (of 45 degree, 135 degree, 255 degree, and 315 degree) and further modulated with 16 kinds of signatures (16 kinds of spreading codes). The signature has a 16-chip length and it is simply repeated 256 times (cited document: 3GPP Specifications: 3GTS25.213 and the like).

The RACH is divided into the Preamble part and a Message part. When a base station does not yet register a mobile station, the mobile station first transmits a Preamble part to the base station in a bursting manner in accordance with a procedure determined by the specification. The base station detects it. When detecting it, the base station transmits an answer in the state of an AICH. The mobile station receives it and, after that, transmits a Message part. It is important for the base station how the Preamble part transmitted in a bursting manner is detected.

Since a phase for the burst transmission is not established, an MF (Matched Filter) as shown in FIG. 11 is used for reception of the RACH so far. FIG. 11 is a block diagram of a conventional RACH demodulating unit.

The MF uses sign codes in which signatures, long codes, and phase rotations are set, and waits for input signals in a window having a certain range.

Since the phase rotations are complex, generally, the MF comprises: a reception data register 92 including two registers provided for an in-phase component and a quadrature component (hereinbelow, referred to as an I component and a Q component) of an input signal; a code register 93 including two registers provided for the I component and Q component; a code product-sum operation unit 94 for performing four kinds of product-sum operations; and a complex operating unit 99 for adding the results of the four kinds of product-sum operations to complete the complex operation.

As for the kinds of signatures, there are 16 kinds in total. It is unnecessary to correspond to all of the 16 kinds at once. It is sufficient to provide some kinds among them. The code registers 93, code product-sum operation units 94, and complex operating units 99 are needed as much as the number of the kinds of signatures.

The size of the window of the MF is determined by a period of time to get there and back from the base station to the mobile station, namely, it is determined by the radius of a cell which the base station covers. For example, when the cell radius is set to 15 km, the period of time (during which a signal gets there and back in such a manner that the base station→mobile station→base station) is about 100 $\mu$s. When it is expressed by the number of chips, it is about 256 chips. The size of the window needed for the MF is 256 chips or more. That is, the MF waits for the signatures having a 16-chip length repetitively for a period of time corresponding to a 256-chip length. In the MF of FIG. 9, the size of the window is set to 256 chips.

When the cell radius is set to 50 km, the window has a size of 1284 chips or more. The reason is as follows. As observed from the base station, since the base station does not know where the mobile station exists in the range covered by the base station, the base station has to detect such signals (RACH) for the nearest mobile station and the farthest mobile station. When the period of time passes as much as such window time, the MF detects the Preamble part by replacing the signatures to the subsequent long codes and repeating the same operation 256 times.

Timing during which the mobile station can transmit the Preamble part is determined. It is limited to an up-link access slot formed by using P-CCPCH always transmitted from the base station as a reference. Therefore, the above-mentioned relation is satisfied.

The conventional RACH demodulating unit will now be described with reference to FIG. 11.

The demodulating unit shown in FIG. 11 comprises: the reception data register 92; code register 93; code product-sum operation unit 94; and complex operating unit 99. The constitution is the normal constitution of the MF.

An input signal is subjected to a code division multiple access (CDMA) modulation and then transmitted. Analog signals (two signals of the I component and Q component) received by an antenna (not shown) are converted into digital signals by an A/D converter (analog/digital converter) 91.

The A/D converter 91 uses a clock higher than a chip time interval during the conversion. The input signals are over-sampled. As for a sampling rate, it is set to 4-times over-sampling in FIG. 9. Accordingly, a signal of 256 chips corresponds to a signal of 1024 samples. The number of output bits of the A/D converter 91 denotes plural numbers. 4 to 8 bits are used.

The code register 93 includes registers for generating sign codes serving as the same spreading codes as those used for the CDMA modulation on the transmission side. One register comprises F/Fs (Flip-Flop) of 256 taps. Sign codes in which the long codes, signatures, and phase rotations are operated are registered in the code register 93 and the code is replaced with one subsequent to the code every 256-chip time.

The code register 93 includes two registers for generating I-component and Q-component sign codes, respectively. As a code register 93, a code generator itself can be also used.

The reception data register 92 includes registers for receiving digital-converted input signals and sequentially shifting them every sampling time. One register comprises F/Fs of 1024 taps and has output terminals for outputting codes to the code product-sum operation unit 94 every 4 taps. Since there are two kinds of input signals of the I component and Q component, two registers are needed in the reception data register 92.

The code product-sum operation unit 94 multiplies a value generated every 4 taps of the reception data register 92 and a value of the code register (256 taps) 93 and adds all of the multiplication results. Accordingly, the scale of the hardware is large.

For the complex operation, the code product-sum operation unit 94 needs product-sum operation units for performing four kinds of product-sum operations. In the code product-sum operation unit 94, the product-sum operation of the I-component input signal and the I-component code, product-sum operation of the Q-component input signal and the I-component code, product-sum operation of the Q-component input signal and the Q-component code, and product-sum operation of the I-component input signal and the Q-component code are executed, respectively.

The complex operating unit 99 adds and subtracts four outputs of the code product-sum operation unit 94 to complete the complex operation. That is, the unit adds the product-sum operation result of the I-component input signal and I-component code and that of the Q-component input signal and Q-component code, and performs the subtraction of the product-sum operation result of the Q-component input signal and I-component code and that of the I-component input signal and Q-component code.

The constitution of the MF shown in FIG. 11 can obtain a correlation output of the input signal according to one kind of signature. Accordingly, when the number of signatures is increased, the constitution in a portion surrounded by a broken line has to be increased as much as the increased number. The reception data register 92 can be used in common irrespective of the number of signatures.

The operation speed of the conventional MF in FIG. 11 is as follows.

An analog signal as reception data received by the antenna has been originally CDMA-modulated on the transmission side. The chip rate is equal to about 4 Mcps (to be accurate, 3.84 Mcps). When it is generally converted into a digital signal by an A/D converter, it is converted at a sampling rate of about 16 MHz (15.36 MHz) that is four times as high as the chip rate. Therefore, the operation speed of each of the subsequent code register 93, product-sum operation unit 94, and the like is equal to about 16 MHz.

Since the number of bits of a code to perform the CDMA modulation is equal to 1, the adders in the code product-sum operation unit 94 cover the greater part of the hardware scale of the MF in FIG. 11. The multiplier can be comprised of a logic circuit for, when a sign indicates "1", generating an input signal as it is and, when it indicates "0", merely inverting the sign of the input signal and generating the resultant signal. On the other hand, the adder has to perform the addition of long bits (6 bits to tens of bits), so that the hardware scale becomes large. As for the register, namely, F/Fs, it is sufficient to arrange F/Fs in parallel as much as the number of bits of the input signal.

As description regarding the conventional matched filter, "Multi-user Demodulating Method and Apparatus" (Applicants: Kokusai Electric Co., Ltd. and Yozan: KK, Inventors: Kenzo Urabe et al.) disclosed in Japanese Patent Laid-Open No. 9-200179/1997 made public on July 31, the 9th year of Heisei (1997) and the like are given.

As mentioned above, in the conventional MF, to detect the Preamble part of the RACH in the base station, the complex MF is needed as much as the number of signatures, so that there are such problems that the number of gates is increased, the circuit scale is increased, and the cost of LSI to construct the MF is raised.

SUMMARY OF THE INVENTION

According to the present invention, it is an object to provide an RACH receiving apparatus in which components can be constructed in a small scale.

According to the present invention, there are provided an RACH receiving apparatus for demodulating a reception signal spread-spectrum by long codes, phase rotation information, and signatures, the apparatus comprising: a first multiplying unit for multiplying the reception signal by first despreading codes operated by the long codes and phase rotation information; a first adding unit for adding a plurality of multiplication results outputted from the first multiplying unit at specific intervals; a second multiplying unit for multiplying a plurality of addition results outputted from the first adding unit by second despreading codes of the signatures; and a second adding unit for adding multiplication results outputted from the second multiplying unit to obtain correlation outputs. A demodulation processing is performed so as to be divided into two stages of a first demodulation processing with the first despreading code and a second demodulation processing with the second despreading code, thereby reducing the total number of adders. Consequently, the circuit scale can be reduced and the power consumption can be reduced.

According to the present invention, the above RACH receiving apparatus includes a complex operating unit for performing a complex operation to correlation outputs generated from the second adding unit. The apparatus can modulate a complex-modulated reception signal and obtain correct correlation outputs.

According to the present invention, in the above RACH receiving apparatus, the complex operating unit for performing the complex operation to the reception signal is provided between the first adding unit and the second multiplying unit. The circuit scale can be further reduced and the power consumption can be reduced.

According to the present invention, there is provided an RACH receiving apparatus for demodulating a reception signal spread-spectrum by long codes, phase rotation information, and signatures, the apparatus comprising: a complex operation processing unit for performing a complex operation processing to the reception signal; a first multiplying unit for multiplying an in-phase component and a quadrature component in the complex operation result by first despreading codes of the long codes; a first adding unit adding a plurality of multiplication results of the in-phase component and the quadrature component outputted from the first multiplying unit at specific intervals; a second multiplying unit for multiplying a plurality of addition results outputted from the first adding unit by second despreading codes of the signatures; and a second adding unit for adding multiplication results outputted from the second multiplying unit to obtain correlation outputs. The circuit scale can be reduced and the power consumption can be reduced.

According to the present invention, in the above RACH receiving apparatus, the first multiplying unit multiplies the in-phase component and the quadrature component in the reception signal by the first despreading codes in a time-division manner at a speed that is integer times as high as a sampling speed of an input signal, and the first adding unit performs the addition at the integer-times speed. The speed of the demodulation processing with the first despreading codes is raised, so that the circuit scale can be further reduced.

According to the present invention, in the above RACH receiving apparatus, the second multiplying unit performs the multiplication of the inputted operation results and the second despreading codes at a speed increased by times corresponding to the number of kinds of the second despreading codes, and the second adding unit performs the addition at the speed increased by times corresponding to the number of kinds of the second despreading codes. The number of multipliers and that of adders for performing the demodulation processing with the second despreading codes can be reduced, so that the circuit scale can be reduced.

According to the present invention, in the above RACH receiving apparatus, the first multiplying unit performs the multiplication of the in-phase component and the quadrature component in the reception signal and the first despreading codes in such a time-division manner that capture timing of the in-phase component and the quadrature component is set to a speed that is integer times as high as a sampling speed of an input signal and, on the other hand, capture timing of the first despreading code is set to a speed that is twice as high as the above speed, and the first adding unit performs the addition at the speed that is twice as high as the integer-times speed. The number of multipliers and that of adders for performing the demodulation processing with the first despreading codes can be reduced, so that the circuit scale can be reduced.

DETAILED DESCRIPTION OF THE PREFERRED EMBODIMENTS

Figure 1:
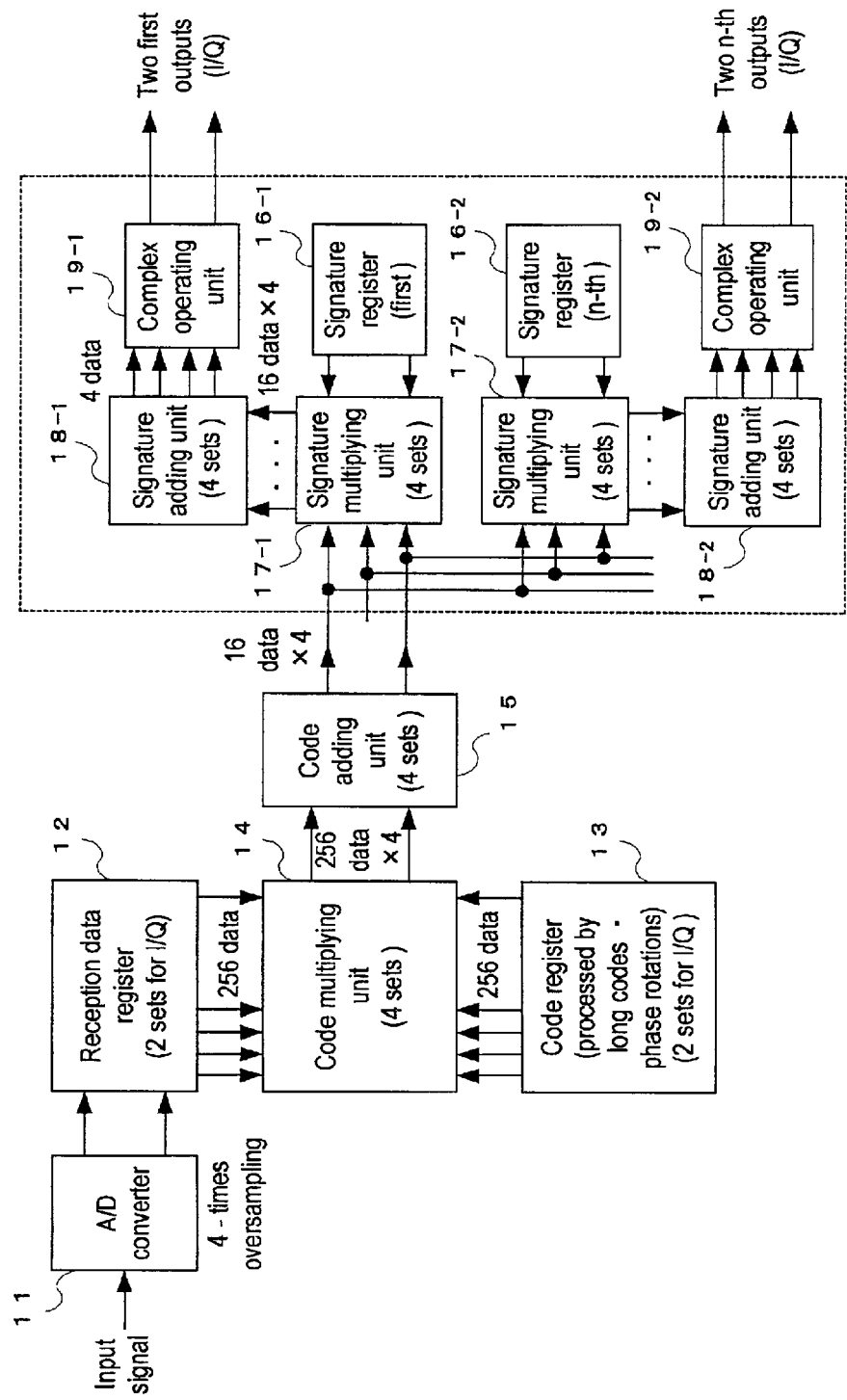
FIG. 1 is a block diagram of a demodulating unit of an RACH receiving apparatus according to a first embodiment of the present invention.

Embodiments of the present invention will now be described with reference to the drawings.

According to a first aspect of the present invention, there is provided an RACH receiving apparatus for demodulating a reception signal spread-spectrum with long codes, phase rotation information, and signatures, the apparatus comprising: a first multiplying unit for multiplying the reception signal by first despreading codes operated by the long codes and phase rotation information; a first adding unit for adding a plurality of multiplication results generated from the first multiplying unit at specific intervals; a second multiplying unit for multiplying a plurality of addition results generated from the first adding unit by second despreading codes of the signatures; and a second adding unit for adding multiplication results generated from the second multiplying unit to obtain correlation outputs. A demodulation processing with the first despreading codes and a demodulation processing with the second despreading codes are performed separately at two stages, so that the total number of adders is decreased to reduce the circuit scale and the power consumption can be reduced.

According to a second aspect of the present invention, there is provided an RACH receiving apparatus for demodulating a reception signal spread-spectrum with long codes, phase rotation information, and signatures, the apparatus comprising: a complex operation processing unit for performing a complex operation processing to the reception signal; a first multiplying unit for multiplying an in-phase component and a quadrature component in the complex operation result by first despreading codes of the long codes; a first adding unit for adding a plurality of in-phase-component and quadrature-component multiplication results generated from the first multiplying unit at specific intervals; a second multiplying unit for multiplying a plurality of addition results generated from the first adding unit by second despreading codes of the signatures; and a second adding unit for adding multiplication results generated from the second multiplying unit to obtain correlation outputs. The circuit scale can be reduced to realize a reduction in power consumption.

The RACH receiving apparatus regarding the above aspects of the present invention has such effects that the operation speed of each of the first multiplying unit and the first adding unit is raised and the operation speed of each of the second multiplying unit and the second adding unit is raised, so that the circuit scale can be further reduced.

In the claims, the first multiplying unit corresponds to a reception data register, a code register, and a code multiplying unit. The first adding unit corresponds to a code adding unit. The second multiplying unit corresponds to a signature multiplying unit. The second adding unit corresponds to a signature adding unit. The complex operation processing unit corresponds to a complex multiplier and a phase rotation register.

The principle of an MF used in the RACH receiving apparatus of the present invention will now be described.

As explained in the description regarding the prior art, the Preamble part of a radio transmission signal treated in an RACH is modulated by long codes and phase rotations and, after that, it is further modulated by signatures. As defined in the 3GPP Specifications, the signature consists of sign codes of a 16-chip length. The sign codes are repeated 256 times and used. 16 kinds of signatures are defined in all.

Accordingly, it can be said that the RACH receiving apparatus can perform a demodulation processing by using an MF for generating correlation outputs for reception data of the minimum 16 chips. On the grounds in communication that it is not enough for the communication within a cell of the base station, detection cannot be performed with high accuracy due to influences of noises, and the like, it is necessary to provide an MF dealing with reception data of 16 chips or more.

In the conventional MF, the code register stores sign codes which have already been subjected to the arithmetic processing with the long codes, phase rotations, and signature codes. The MF performs the demodulation processing to reception data with the sign codes. The RACH receiving apparatus uses an MF for performing a demodulation processing separately at two stages. That is, the apparatus uses the MF for performing the demodulation processing with long codes and phase rotations in a first demodulation processing and performing a demodulation processing with the signature codes in a second demodulation processing.

Specifically, the MF allows the code register to store sign codes subjected to the arithmetic processing with the long codes and phase rotations and perform the multiplication processing of reception data and the sign code every chip, namely, the first demodulation processing. The multiplication results obtained every chip by the demodulation processing are added every 16 chips and respective addition results are multiplied by the signature codes, thereby performing the second demodulation processing. The processing results of the second demodulation processing are added to generate correlation outputs.

Using the MF for performing such processings can reduce the number of adders, which occupy the greater part of the MF circuit. Consequently, the circuit scale of the RACH receiving apparatus can be reduced.

The constitution of a demodulating unit (MF) according to a first embodiment of the present invention will now be described with reference to FIGS. 1 and 9. FIG. 1 is a block diagram of the demodulating unit (MF) according to the first embodiment (hereinbelow, referred to as an embodiment 1) of the present invention. The MF of FIG. 1 generates correlation outputs from complex-modulated reception data of the RACH of 256 chips obtained by 4-times oversampling. The MF of FIG. 1 generates the correlation outputs by using two kinds of signature codes.

The MF according to the embodiment 1 of the present invention comprises: an A/D converter 11; a reception data register 12; a code register 13; a code multiplying unit 14; a code adding unit 15; signature registers 16-1 and 16-2; signature multiplying units 17-1 and 17-2; signature adding units 18-1 and 18-2; and complex operating units 19-1 and 19-2.

The A/D converter 11 converts an analog signal received by an antenna (not shown) of the RACH receiving apparatus into digital reception signals at a speed that is four times as high as a transmission rate of the analog signal. The transmission speed of the analog signal is equal to 4 Mcps. The A/D converter converts the analog signal of one bit including an in-phase component (hereinbelow, referred to as an I component) and a quadrature component (hereinbelow, referred to as a Q component) into digital reception signals of multi-bits at 16 Mbps that is four times as high as the above speed, respectively.

The reception data register 12 has serially connected F/Fs of 1024 taps. When the reception data is inputted from the A/D converter, the register sequentially shifts the reception data stored in the respective F/Fs to the next-stage F/Fs.

The reception data register 12 has output terminals in the F/Fs every 4 taps and tap-outputs the reception data from the output terminals to the code multiplying unit 14 every sampling period. To store the I-component and Q-component reception data, the reception data register 12 has two rows of F/Fs for performing the above operation.

In other words, the reception data register 12 can store 4-times-oversampled reception data of 256 chips and generates the 256 reception data in each chip every sampling period.

The reception data register 12 of the embodiment 1 has a constitution in which the F/Fs are serially connected. Any constitution, for example, a memory or the like can be used so long as it has the above-mentioned function for storing reception data.

The code register 13 has F/Fs of 256 taps, stores codes (hereinbelow, referred to as halfway demodulated sign codes) subjected to the arithmetic processing with the long codes and phase rotations of 256 taps among modulation sign codes used in the modulation of the reception data and tap-outputs them to the code multiplying unit 14. To store the I-component and Q-component halfway demodulated sign codes, the code register 13 also has two groups of F/Fs for performing the above-mentioned operation.

As a reception code register 13 of the embodiment 1, any constitution, for example, a memory or the like can be used so long as it can store the above-mentioned halfway demodulated sign codes. The code register 13 according to the embodiment 1 can use a device or circuit for forming halfway demodulated sign codes.

The code multiplying unit 14 has a group of 256 multipliers, performs multiplication of the reception data of the respective components generated from the reception data register 12 and the halfway demodulated sign codes of the components generated from the code register 13 as much as 256 taps, and generates multiplication results to the code adding unit 15.

Since the code multiplying unit 14 performs the multiplication of all the combinations of the reception data of the respective components and the halfway demodulated sign codes of the components for the correlation arithmetic processing, it is necessary to perform four kinds of multiplication. For this purpose, four groups of multipliers for performing the above-mentioned multiplication processings are provided for the unit. Accordingly, the code multiplying unit 14 generates the multiplication results of (256×4=) 1024 every sampling period.

As for the four kinds of multiplication results generated from the code multiplying unit 14, the code adding unit 15 adds the multiplication results obtained every 16 taps every kind and generates the addition results to the signature multiplying units 17-1 and 17-2.

Figure 9:
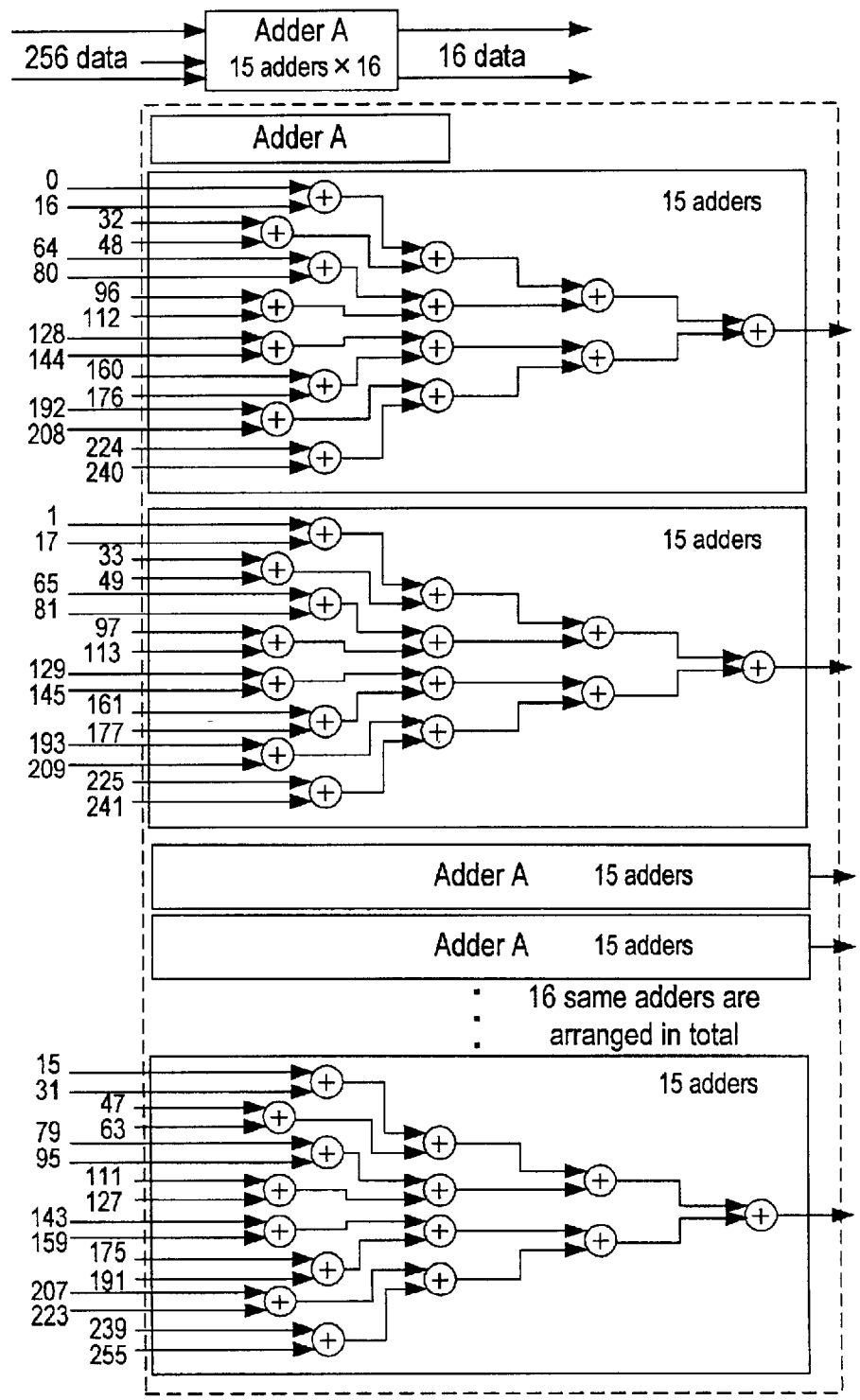
FIG. 9 is a block diagram of register code adding units in a matched filter of the present invention.

FIG. 9 is a block diagram of the code adding unit 15. FIG. 9 shows a component for performing addition for the one kind of multiplication results. Actually, four set of components shown in FIG. 9 are provided for the code adding unit 15.

As shown in FIG. 9, to perform the addition for the one kind of multiplication results, the code adding unit 15 has a constitution in which 16 circuit groups each comprising 15 adders are arranged. Each circuit group adds the multiplication results obtained every 16 taps and generates it. Referring to FIG. 9, each portion surrounded by a solid line denotes the circuit group.

Referring to FIG. 9, numbers written on the left ends of the respective circuit groups denote tap numbers of the multiplication results. 0 to 255 are assigned as tap numbers of the multiplication results. The circuit group at the top stage generates the total sum of 16 multiplication results having the tap numbers assigned every 16 from 0. Accordingly, since the adders are arranged in a hierarchical structure to obtain the total sum of the 16 multiplication results, each circuit group needs 15 adders.

In each circuit group, as the level of the hierarchy is upgraded, the corresponding bit number of the adder is increased.

The circuit groups of the next and subsequent stages obtain the total sum of the multiplication results of the tap numbers assigned every 16 from 1, the total sum of the multiplication results of the tap numbers assigned every 16 from 2, . . . , respectively. Finally, 16 total sums are generated from the circuit groups. Since the code adding unit 15 needs 4 sets of the circuit groups shown in FIG. 9 in total, (15×16×4=) 960 adders are needed, so that the addition results to be generated is equal to (16×4=) 64 in all.

In the code adding unit 15 of the embodiment 1, the addition in each circuit group can be also performed in hierarchical order of the adders in a time-division manner.

The signature registers 16-1 and 16-2 store signature codes used during the modulation of the reception data. Each signature register has stored different signature codes. The signature register 16-1 generates the signature codes of a 16-chip length stored therein to the signature multiplying unit 17-1 and the signature register 16-2 generates them stored therein to the signature multiplying unit 17-2, respectively.

As for the signature registers 16-1 and 16-2 of the embodiment 1, devices or circuits for forming signature codes can be also used.

The signature multiplying units 17-1 and 17-2 perform multiplication of the (16×4) addition results generated from the code adding unit 15 and the signature codes generated from the signature registers 16-1 and 16-2 and generate the multiplication results to the signature adding units 18-1 and 18-2.

Specifically, the signature multiplying unit 17-1 generates the multiplication results of the addition results and the signature codes stored in the signature register 16-1 to the signature adding unit 18-1, and the signature multiplying unit 17-2 generates the multiplication results of the addition results and the signature codes stored in the signature register 16-2 to the signature adding unit 18-2, respectively.

For the four kinds of multiplication results (16 results every kind) generated from the code adding unit 15, each of the signature multiplying units 17-1 and 17-2 multiplies each multiplication result of each kind by the signature code every chip. Each of the signature multiplying units 17-1 and 17-2 comprises (16×4=) 64 multipliers.

From the four kinds of multiplication results (16 results every kinds) obtained by signature codes generated from the signature multiplying units 17-1 and 17-2, the signature adding units 18-1 and 18-2 obtain the total sums of the respective kinds of multiplication results and generate them, respectively.

Specifically, the signature adding unit 18-1 obtains the total sum of the multiplication results generated from the signature multiplying unit 17-1 to generate it. The signature adding unit 18-2 obtains the total sum of the multiplication results generated from the signature multiplying unit 17-2 to generate it.

Each of the signature adding units 18-1 and 18-2 has the constitution including the circuit groups in the code adding unit 15 shown in FIG. 9, in which adders are arranged. Each of the signature adding units 18-1 and 18-2 has four circuit groups, so that (15×4=) 60 adders are needed.

The complex operating units 19-1 and 19-2 perform complex operations based on the addition and subtraction processings for the four kinds of addition results generated from the signature adding units 18-1 and 18-2 and generate the operation results as correlation outputs, respectively.

Specifically, the complex operating unit 19-1 performs the complex operation to the addition results generated from the signature adding unit 18-1 and the complex operating unit 19-2 performs the complex operation to the addition results generated from the signature adding unit 18-2, respectively. Each of the complex operating units 19-1 and 19-2 comprises two adders.

As for the digital reception signal processed in the MF according to the embodiment 1 of the invention, it is necessary to process the signal generally as 8-bit data for the demodulation processing. It is enough to treat it as 4-bit data for the detection of the Preamble part of the RACH.

Accordingly, when 4-bit reception data is stored into the reception data register 12, (1024×4=) 4096 F/Fs are needed in all. That is, 1 tap=4 bits.

Similarly, to store one kind of halfway demodulated sign code into the code register 13, the register needs a capacity of (256×4=) 1024 bits. Further, it is needless to say that the adders and multipliers used in the respective units constituting the MF of the embodiment 1 have to deal with the arithmetic operation of 4 bits or more.

The above-mentioned units constituting the MF according to the embodiment 1 of the present invention operate at a speed of 16 MHz.

In the MF according to the embodiment 1 of the present invention, it is necessary to arrange the signature register 16, signature multiplying unit 17, signature adding unit 18, and complex operating unit 19 as much as the number of kinds of signature codes used during the modulation.

Subsequently, the operation of the MF of the embodiment 1 of the present invention will now be described with reference to FIGS. 1 and 9.

A complex modulation analog signal received by the antenna of the RACH receiver is converted into I-component and Q-component digital reception signals by the A/D converter. The A/D converter converts the analog signal transmitted at a speed of 4 Mcps into the digital reception signals at 16 Mbps that is four times as high as the above speed.

The digital reception signals of the respective components converted by the A/D converter are inputted to the reception data register 12. When the digital reception signals are supplied in the reception data register 12, the reception data stored in each F/F is shifted to the next stage and the reception data is generated from each of the output terminals provided every 4 taps. In other words, the reception data register 12 generates the reception data of 256 chips for each component every sampling period.

The code register 13 generates the stored halfway demodulated sign codes of each component as much as 256 chips every sampling period.

The reception data of the respective components generated from the reception data register 12 and the halfway demodulated sign codes of the components generated from the code register 13 are supplied to the code multiplying unit 14.

When the I-component and Q-component reception data are set to $R_I$ and $R_Q$ and the I-component and Q-component spreading codes are set to $C_I$ and $C_Q$, respectively, multiplication results of ($R_I \times C_I$), ($R_I \times C_Q$), ($R_Q \times C_I$), and ($R_Q \times C_Q$) are needed to demodulate the reception data modulated by the complex modulating method. To obtain the respective multiplication results, the code multiplying unit 14 has four groups of multipliers in which the multiplication can be performed as much as 256 chips.

When the respective groups of multipliers in the code multiplying unit 14 perform the multiplication, four kinds of multiplication results each corresponding to 256 chips are generated to the code adding unit 15. In this manner, the first demodulation processing is completed.

As mentioned above, in the code adding unit 15, the one kind of multiplication results are added every 16 taps by the 16 circuit groups each comprising 15 adders and 16 total sums are generated from the circuit groups. That is, the 16 total sums of the multiplication results of different addition-starting chip positions every 16 chips are calculated from the circuit groups. Since those operations are performed to all of the four kinds of multiplication results, (16×4=) 64 addition results are generated in total to the signature multiplying units 17-1 and 17-2.

The four kinds of addition results (16 results every kind) generated to the signature multiplying units 17-1 and 17-2 are multiplied by the signature codes stored in the signature registers 16-1 and 16-2. The signature code is 1-bit data of a 16-chip length. In the signature multiplying units, the respective kinds of addition results are multiplied by the codes. The (16×4=) 64 multiplication results are generated from each of the signature multiplying units 17-1 and 17-2 to each of the signature adding units 18-1 and 18-2. The second demodulation processing is performed by the multiplication processings in the signature multiplying units 17-1 and 17-2.

The addition results generated from the code adding unit 15 are obtained by adding the multiplication results of the reception data and the halfway demodulated sign codes every 16 chips. Since 16 addition results of the one kind have different addition-starting chip positions, the respective addition results are multiplied by bit data of the signature codes on the chip positions corresponding to the addition results, thereby finally obtaining the same results as those obtained in such a manner that the reception data is demodulated by the long codes, phase rotations, and signature codes and added every 16 chips.

For the respective kinds of multiplication results in the signature multiplying units 17-1 and 17-2, the signature adding units 18-1 and 18-2 obtain the total sums of the respective kinds of multiplication results. As mentioned above, each of the signature adding units 18-1 and 18-2 includes four circuit groups in each of which the adders are arranged as shown in the code adding unit of FIG. 9. Each circuit group calculates the total sum of the multiplication results every kind. The addition processings in the signature adding units 18-1 and 18-2 obtain the total sum of the reception data demodulation processing results of 256 chips every kind.

The addition results of the signature adding units 18-1 and 18-2 are generated to the complex operating units 19-1 and 19-2, respectively. The complex operating units 19-1 and 19-2 perform the complex operations on the basis of the total sums of the demodulation processing results every kind and generate the operation results as correlation outputs.

I-component and Q-component demodulation reception data $T_I$ and $T_Q$ are expressed as follows by using the foregoing defined symbols.

$$T_I = R_I \times C_I - R_Q \times C_Q \quad (1)$$

$$T_Q = R_Q \times C_I + R_I \times C_Q \quad (2)$$

To realize the arithmetic equations shown by the equations (1) and (2), each of the complex operating units 19-1 and 19-2 comprises two adders.

The addition processings in the complex operating units 19-1 and 19-2 can obtain the correlation outputs as much as 256 chips of the I-component and Q-component reception data modulated by the signature codes. The correlation outputs are generated every sampling timing. The optimum timing can be detected on the basis of the correlation outputs every sampling timing and, further, the Preamble part of the RACH can be detected.

According to the embodiment 1 of the present invention, the MF has such a constitution that the demodulation processing is performed so as to be divided into two stages such as the first demodulation processing for multiplying the complex-modulated reception data of the RACH by sign codes subjected to the arithmetic processings of the long codes and phase rotations and the second modulating process for adding the multiplication results every 16 chips and multiplying the addition results by the signature codes. Consequently, the necessary total number of adders can be lowered than that in the conventional MF.

As for the number of adders used in the MF according to the embodiment 1 of the present invention, the register code adding unit 15 has (15×16×4=) 960 adders, each signature adding unit 18 has (15×4=) 60 adders, and each complex operating unit 19 has two adders. When it is assumed that the number of kinds of signature codes used during the modulation is set to n, the total number of adders used in the MF according to the embodiment 1 of the present invention is expressed by (960+62×n). In the conventional MF, since the product-sum operation unit 94 needs (255×4=) 1020 adders and the complex operating unit 99 needs two adders, the total number of adders is equal to 1022×n.

When the total numbers of adders are compared simply, in case of using the one kind of signature codes, the number of adders to be used in the MF according to the embodiment 1 of the present invention is equivalent to that of the conventional one. When the kinds of signature codes is increased more, a difference therebetween remarkably becomes larger. For example, when an analog signal is modulated by eight kinds of signature codes, the total number of necessary adders in the MF according to the embodiment 1 of the present invention is about 18% of that in the conventional MF.

In the conventional MF, the sign codes subjected to the arithmetic processings with the long codes, phase rotations, and signature codes have already been stored in the code registers and the product-sum operation unit performs the product-sum operation by using the sign codes. Accordingly, each time the number of kinds of signatures to be used is increased, the code register and product-sum operation unit have to be further provided individually.

In the MF according to the embodiment 1 of the present invention, since the demodulation processing using the signature is separately performed as a second demodulation processing, irrespective of the number of kinds of signature, it is enough to provide the code register 13, code multiplying unit 14, and code adding unit 15, which uses the most adders, by one. It is enough to provide the signature register 16, signature multiplying unit 17, signature adding unit 18, and complex operating unit 19 every kind of signature.

According to the embodiment 1 of the present invention, since the MF has such a constitution that the demodulation processing for the reception data of the RACH is performed so as to be divided into two stages of the first demodulation processing regarding the long codes and phase rotations and the second demodulation processing regarding the signatures, it has the effect of realizing a reduction in circuit scale. Particularly, since the number of adders occupying the great part of the MF circuit can be reduced, the circuit scale of the MF circuit can be extremely reduced, so that there is such an effect that the circuit scale of the RACH receiving apparatus can be reduced. Since the MF circuit scale can be reduced without changing the operation speed as compared with the conventional one, the MF has such an effect that the power consumption can be reduced.

Figure 2:
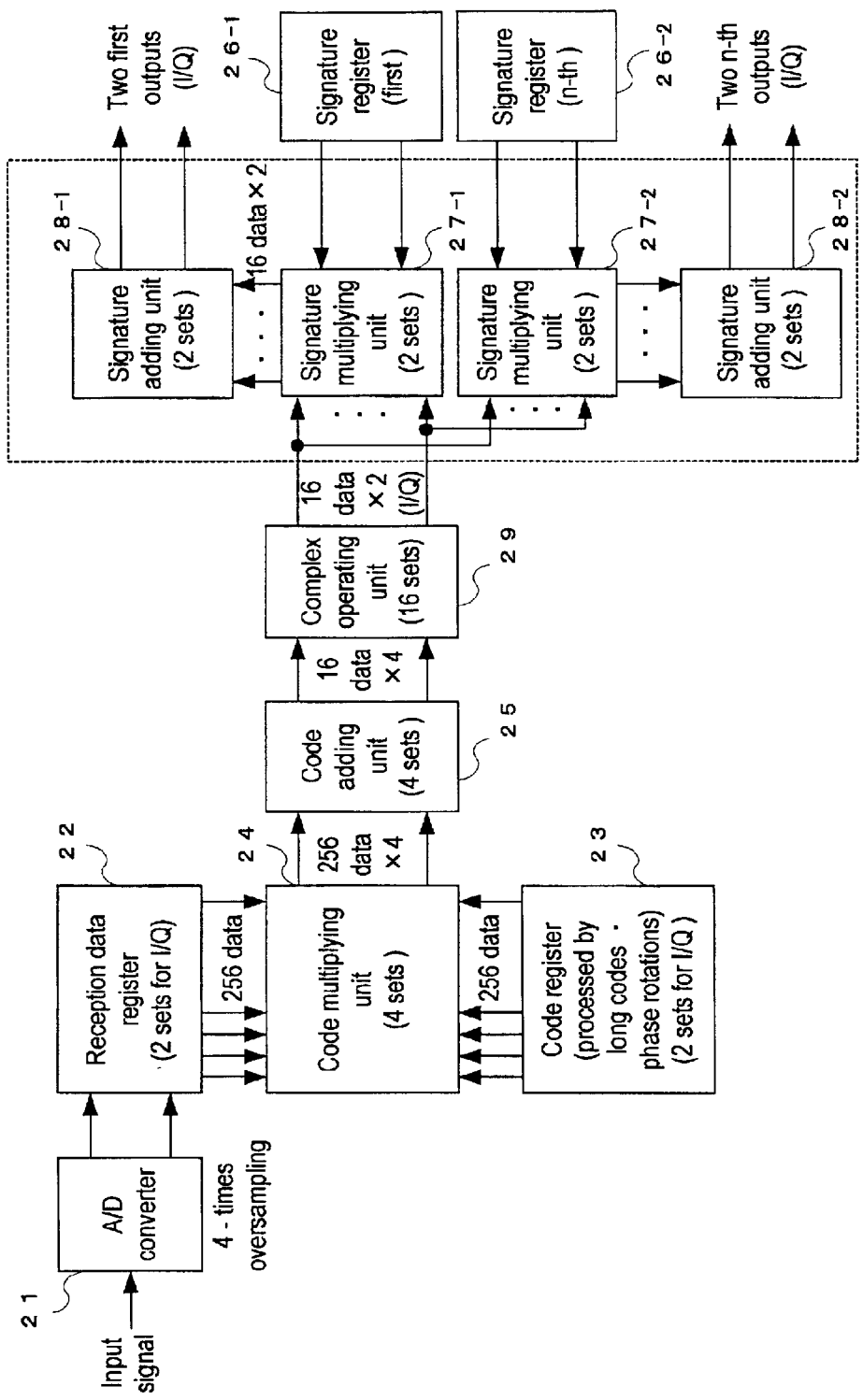
FIG. 2 is a block diagram of a demodulating unit of an RACH receiving apparatus according to a second embodiment of the present invention.

FIG. 2 is a block diagram of a demodulating unit according to a second embodiment of the present invention. The constitution and operation of the demodulating unit (MF) according to the second embodiment (hereinbelow, referred to as an embodiment 2) of the present invention will now be described hereinbelow with reference to FIG. 2 with emphasis on a difference between the present MF and that of FIG. 1.

The MF of FIG. 2 is different from that of FIG. 1 with respect to such a point that a complex operating unit 29 is provided between a register code adding unit 25 and signature multiplying units 27 and output results of signature adding units 28-1 and 28-2 become correlation outputs as they are. The MF of FIG. 2 also obtains the correlation outputs by using two kinds of signature codes.

Since the signature code used in the RACH is not the complex number, even when the complex operation is performed before the demodulation processing with the signature codes, there is no influence on the demodulation results of reception data. The MF of FIG. 2 utilizes such a feature and has a construction that the complex operating unit for performing the complex operation on the basis of the addition results obtained by the signature adding units in the MF of FIG. 1 is provided before the signature multiplying units and the complex operation processing is performed before the demodulation processing with signature codes.

The constitutions and operations of an A/D converter, a reception data register 22, and units up to the code adding unit 25 in the MF of FIG. 2 are the same as those of the MF of FIG. 1. Four kinds of addition results each having an amount of 256 chips generated from the code adding unit 25 are generated to the complex operating unit 29.

In the complex operating unit 29 in FIG. 2, since the complex operation of different kinds of addition results added every 16 chips from the same starting chip position is performed, 16 sets of two adders for performing the I-component and Q-component complex operations are needed. That is, in the complex operating unit 29, the above-mentioned complex operating equations (1) and (2) are realized by (2×16) adders.

The 16 combinations of I-component and Q-component operation results generated from the complex operating unit 29 are generated to the signature multiplying units 27-1 and 27-2 and they are multiplied by corresponding signature codes, respectively.

To perform the multiplication of all the I-component and Q-component operation results and the signature codes, each of the signature multiplying units 27-1 and 27-2 requires (16×2) multipliers. Since the I-component and Q-component operation results are multiplied by bit data of signature codes on chip positions corresponding to the respective operation results, the demodulation processing with the signature codes is accurately performed.

The (16×2=) 32 multiplication results are generated from the signature multiplying unit 27-1 to the signature adding unit 28-1 and the (16×2=) 32 multiplication results are generated from the signature multiplying unit 27-2 to the signature adding unit 28-2, respectively. As for the 16 sets of I-component and Q-component multiplication results in each of the signature multiplying units 27-1 and 27-2, the total sum of the multiplication results of each component is obtained in each of the signature adding units 28-1 and 28-2.

In each of the signature adding units 28-1 and 28-2, as shown in the code adding unit of FIG. 9, two circuit groups in each of which the adders are arranged are provided. Each circuit group calculates the total sum of the multiplication results every component and generates the calculation results as I-component and Q-component correlation outputs.

The respective units constituting the MF according to the above-mentioned embodiment 2 of the present invention operate at a speed of 16 MHz.

In the MF according to the embodiment 2 of the present invention, it is necessary to provide the signature register 26, signature multiplying unit 29, and signature adding unit 28 as much as the number of kinds of signature codes used during the modulation. The constitutions and operations of the other units are the same as those of the corresponding units in the MF of FIG. 1.

As for the number of adders used in the MF according to the embodiment 2 of the present invention, the register code adding unit 25 has (15×16×4=) 960 adders, complex operating unit 29 has two adders, and each signature adding unit 28 has (15×2=) 30 adders. When the number of kinds of signature codes used during the modulation is set to n, the total number of adders used in the MF of the embodiment 2 of the present invention is expressed by (962+30×n). It is clear that it is smaller than the number of adders used in the MF of the embodiment 1.

According to the embodiment 2 of the present invention, the MF has such a constitution that the complex operation is performed to reception data before the demodulation processing with signatures, so that there are such effects that the number of adders to be used can be further reduced, the circuit scale of the MF circuit can be further reduced, and the circuit scale of the RACH receiving apparatus can be reduced. Since the MF circuit scale can be reduced without changing the operation speed, there is such an effect that the power consumption can be reduced.

Figure 3:
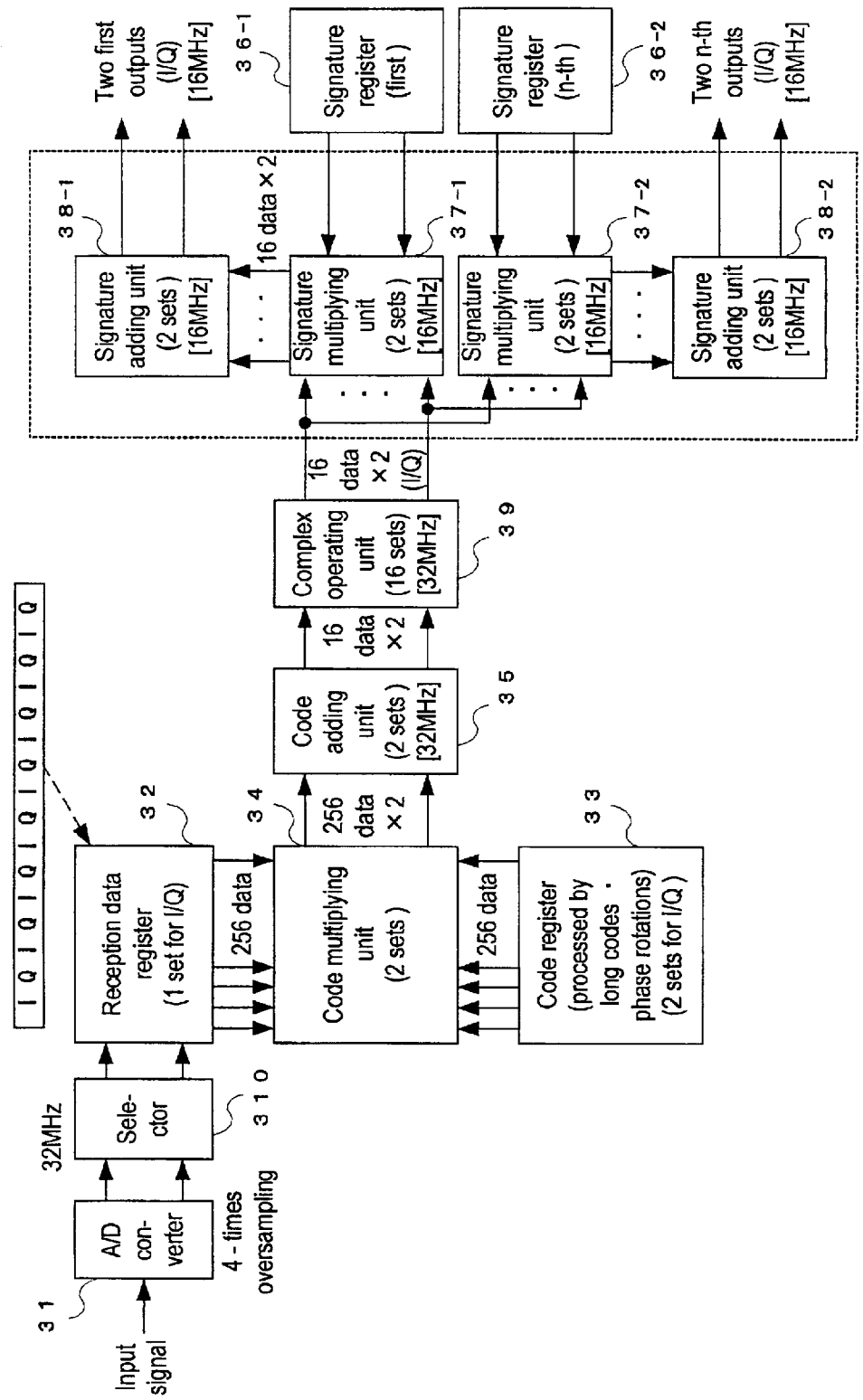
FIG. 3 is a block diagram of a demodulating unit of an RACH receiving apparatus according to a third embodiment of the present invention.

FIG. 3 is a block diagram of a demodulating unit (MF) according to a third embodiment of the present invention. The constitution and operation of the MF according to the third embodiment (hereinbelow, referred to as an embodiment 3) of the present invention will now be described hereinbelow with reference to FIG. 3 with emphasis on a difference between the present MF and that of FIG. 2.

In the MF of FIG. 3, I-component and Q-component digital reception data converted at a speed of 16 Mbps by an A/D converter 31 are alternately switched at a speed of 32 MHz by a selector 310 to be generated to a reception data register 32.

The reception data register 32 comprises serially connected F/Fs of 2048 taps. When receiving reception data from the selector 310, the register sequentially shifts reception data stored in each F/F to the next-stage F/F. The reception data register 32 has output terminals on the F/Fs every 8 taps and generates the reception data from the output terminals to a code multiplying unit 34 in a tapping manner at a speed that is half of the sampling period, namely, 32 MHz.

In other words, in the reception data register 32, the I-component and Q-component reception data generated from the selector 310 at a speed of 32 MHz are alternately inputted to the F/Fs and shifted. The reception data register 32 can store the I-component and Q-component reception data as much as 256 chips, the data being subjected to the 4-times oversampling, and generates the 256 reception data each chip alternately every component at a speed of 32 MHz.

Similar to the code registers in FIGS. 1 and 2, a code register 33 has 256-tap F/Fs for storing the I-component and Q-component halfway demodulated sign codes, respectively. Each of the F/Fs generates the stored halfway demodulated sign code to the register multiplying unit 34 at a speed of 16 MHz.

The code multiplying unit 34 has two multiplier groups each comprising 256 multipliers. The unit performs the multiplication of the reception data of the respective components generated from the reception data register 32 and the halfway demodulated sign codes of the components generated from the code register 33 as much as 256 taps at a speed of 32 MHz and generates the multiplication results to a code adding unit 35.

As mentioned above, the reception data of the respective components are alternately inputted from the reception data register 32 to the code multiplying unit 34 at a speed of 32 MHz. For example, when I-component reception data $R_I$ is inputted from the reception data register 32 at certain timing, the code multiplying unit 34 performs the multiplying operations of $(R_I \times C_I)$ and $(R_I \times C_Q)$. Since Q-component reception data $R_Q$ is inputted after ½ sampling period, the multiplying operations of $(R_Q \times C_I)$ and $(R_Q \times C_Q)$ are further performed.

Those multiplying operations are completed within one sampling period and all of the combinations of the products of reception data and spreading codes necessary for the demodulation are obtained. Accordingly, it is enough to provide two multiplier groups according to the codes of the respective components.

Four kinds of multiplication results each having an amount as much as 256 taps generated from the code multiplying unit 34 are inputted to the code adding unit 35. The code adding unit 35 has two circuit groups in which adders are arranged as shown in the code adding unit in FIG. 9 and generates (16×2=) 32 addition results at a speed of 32 MHz.

As mentioned above, since the code multiplying unit 34 alternately generates two kinds of multiplication results among the four kinds of multiplication results at a speed of 32 MHz, the completion of the four kinds of addition results necessary for the complex operation requires one sampling period. The addition processing of the code adding unit 35 is the same as those of the code adding units in the MFs of FIGS. 1 and 2.

The four kinds of addition results (16 results every kind) generated from the code adding unit 35 are inputted to a complex operating unit 39 to perform the complex operation.

Four kinds of combinations of the products of reception data and spreading codes are needed for the complex operation. As mentioned above, the completion of all the combinations requires the elapse of one sampling period, so that the complex operating unit 39 generates 16 sets of the I-component and Q-component complex operation results at a speed of 16 MHz.

Accordingly, the complex operating unit 39 needs to have such a construction that the addition results generated from the code adding unit 35 are temporarily stored by using, for example, a memory and the operation is performed at point of time when the addition results necessary for the complex operation are completed. To execute the above-mentioned operation by the complex operating unit 39, a speed for the storage and operation of the addition results is equal to 32 MHz.

The 16 combinations of I-component and Q-component operation results are generated from the complex operating unit 39 to signature multiplying units 37-1 and 37-2. From that time forward, the demodulation processing with the signatures and correlation outputs are performed at a speed of 16 MHz. Since the constitutions and operations of signature register 36, signature multiplying unit 37, and signature adding unit 38 are the same as the corresponding units in the MF of FIG. 2, the description is omitted.

Also in the MF according to the embodiment 3 of the present invention, it is necessary to provide the signature register 36, signature multiplying unit 37, and signature adding unit 38 as much as the kinds of the signature codes used during the modulation.

In the MF of FIG. 3, since the processing speed is doubled in the unit for performing the demodulation processing with the halfway demodulated sign codes, the power consumption of the unit whose processing speed is raised is twice as high as that of the MF of FIG. 2. On the other hand, when the circuit scale is compared with that of the MF in FIG. 2, 4 multiplier groups can be reduced in half to 2 groups in the code multiplying unit 34, the number of multipliers can be reduced by (256×2=) 512, and the number of adders can be reduced by (15×16×2=) 480 in the code adding unit 35. The total number of adders used in the MF of FIG. 3 is expressed as (480+30×n).

According to the embodiment 3 of the present invention, the MF has such a constitution that the processing speed of the unit for performing the demodulation processing with the halfway demodulated sign codes is raised and the demodulation processing is performed in a time-division manner, so that there are such effects that the number of multipliers and that of adders in the units for performing the demodulation processing with the halfway demodulated sign codes can be reduced, the circuit scale of the MF circuit can be further reduced, and the circuit scale of the RACH receiving apparatus can be reduced.

Figure 4:
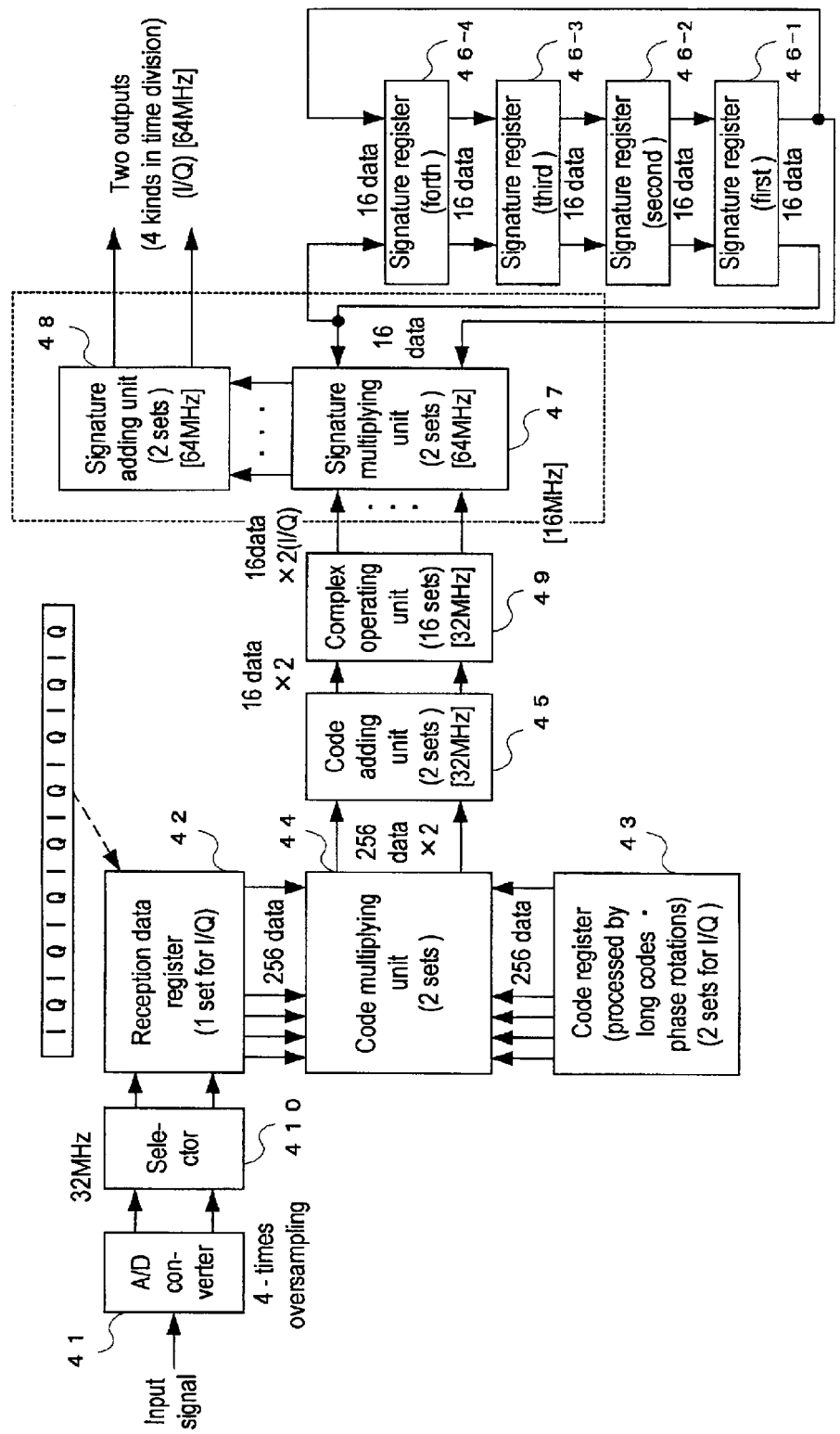
FIG. 4 is a block diagram of a demodulating unit of an RACH receiving apparatus according to a fourth embodiment of the present invention.

FIG. 4 is a block diagram of a demodulating unit (MF) according to a fourth embodiment of the present invention. The constitution and operation of the MF according to the fourth embodiment (hereinbelow, referred to as an embodiment 4) of the present invention will now be described hereinbelow with reference to FIG. 4 with emphasis on a difference between the present MF and that of FIG. 3.

The MF of FIG. 4 is a modification of the MF according to the embodiment 3 of the present invention, in which the processing speed of the unit for performing the demodulation processing with four kinds of signatures is raised and the demodulation processing is performed in a time-division manner.

Since the constitutions and operations of units from an A/D converter 41 up to a complex operating unit 49 in the MF of FIG. 4 are the same as those of the corresponding units in the MF of FIG. 3, the description is omitted. That is, similar to the MF of FIG. 3, also in the MF of FIG. 4, the demodulation processing with the halfway demodulated sign codes is performed to I-component and Q-component reception data at a speed of 32 Mbps in a time-division manner, the addition processing is performed every 16 chips, and after that, the complex operation is performed to each addition result. 16 sets of I-component and Q-component complex operation results are generated from the complex operating unit 49 at a speed of 16 Mbps.

The 16 sets of I-component and Q-component complex operation results generated from the complex operating unit 49 are inputted to the signature multiplying unit 47. Although the constitution and operation of the signature multiplying unit 47 are the same as those of the signature multiplying unit 37 in FIG. 3, the processing speed is 64 MHz that is four times as high as that of the unit 37.

The signature registers 46-1 to 46-4 generate signature codes stored therein to the signature multiplying unit 47 at a speed of 64 MHz so as to be switched in a time-division manner. The signature registers 46-1 to 46-4 perform the above-mentioned operation in a circulating manner.

Accordingly, the signature multiplying unit 47 performs multiplication of the same complex operation result by different signature codes at a speed of 64 MHz, so that the demodulation processing with a plurality of signatures is performed by one multiplying unit.

As for 16 sets of I-component and Q-component multiplication results generated from the signature multiplying unit 47, the total sums of the respective components are calculated by the signature adding unit 48 and generated as correlation outputs. The constitution and operation of the signature adding unit 48 are the same as those of the signature adding unit 38 in FIG. 3. However, since the processing speed of the unit 48 is 64 MHz, the correlation output can be generated every kind of signature.

In the MF of FIG. 4, the processing speed of the unit for performing the demodulation processing with the signatures is increased by times corresponding to the number of kinds of signatures, so that the setting number of signature multiplying units 47 and that of signature adding units 48 can be reduced.

In the MF of FIG. 4, since the demodulation processing with the four kinds of signatures is performed by one combination of the signature multiplying unit 47 and the signature adding unit 48, the number of multipliers can be reduced by (16×2×3=) 96 and the number of adders can be reduced by (15×2×3=) 90 as compared with the case where the four kinds of signatures are used in the MF of FIG. 3.

In the MF according to the embodiment 4 of the present invention, the combination of the signature registers, signature multiplying unit, and signature adding unit can be also arranged in parallel according to the number of kinds of signatures. It is preferable to allow the processing speed of each unit of the combination to correspond to the number of kinds of signatures included in the combination of the units.

According to the embodiment 4 of the present invention, the MF has a constitution that the processing speed of the units for performing the demodulation processing with the signatures is increased by times corresponding to the number of kinds of signatures and the demodulation processing with the plurality of signatures is performed in a time-division manner, so that there are such effects that the number of multipliers and that of adders in the units for performing the demodulation processing with the signatures can be reduced, the circuit scale of the MF circuit can be further reduced, and the circuit scale of the RACH receiving apparatus can be reduced.

Figure 5:
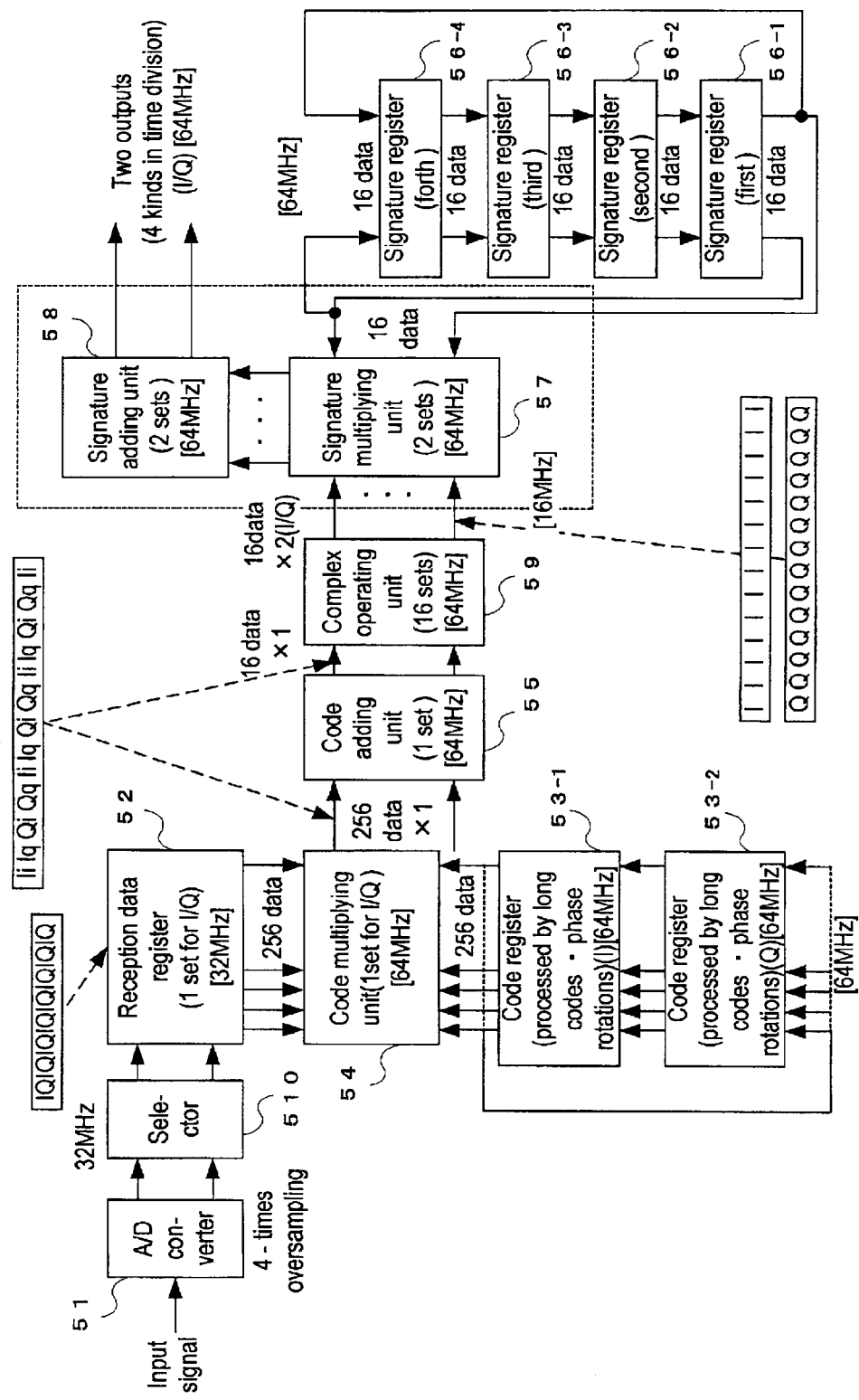
FIG. 5 is a block diagram of a demodulating unit of an RACH receiving apparatus according to a fifth embodiment of the present invention.

FIG. 5 is a block diagram of a demodulating unit (MF) according to a fifth embodiment of the present invention. The constitution and operation of the MF according to the fifth embodiment (hereinbelow, referred to as an embodiment 5) of the present invention will now be described hereinbelow with reference to FIG. 5 with emphasis on a difference between the present MF and that of FIG. 4. FIG. 5 shows the MF as a modification of the MF according to the embodiment 4 of the present invention, in which the processing speed of a code register 53 and that of a code multiplying unit 54 are raised and the demodulation processing is performed in a time-division manner.

In the MF of FIG. 5, since the constitutions and operations of an A/D converter 51 and a reception data register 52 are the same as those of the corresponding units in the MF of FIG. 4, the explanation is omitted. The reception data register 52 can generate I-component and Q-component reception data as much as 256 chips to the code multiplying unit 54 at a speed of 32 MHz so as to alternately switch them.

On the other hand, as for the code register, an I-component code register 53-1 for storing I-component halfway demodulated sign codes and a Q-component code register 53-2 for storing Q-component halfway demodulated sign codes are provided. The registers are alternately switched to generate the stored halfway demodulated sign code to the code multiplying unit 54 at a speed of 64 MHz. Each of the I-component code register 53-1 and Q-component code register 53-2 comprises F/Fs of 256 taps.

The code multiplying unit 54 has one multiplier group comprising 256 multipliers. The unit performs multiplication of reception data of the respective components and the halfway demodulated sign codes of the components as much as 256 taps at a speed of 64 MHz and generates multiplication results to a code adding unit 55.

The reception data register 52 alternately generates the reception data of the respective components at a speed of 32 MHz. While the reception data of the respective components is generated, the I-component code register 53-1 and Q-component code register 53-2 generate the halfway demodulated sign codes of the respective components, respectively. Accordingly, since the multiplication of the reception data and halfway demodulated sign code of each kind is performed every ¼ sampling period and the multiplication results regarding all of the combinations are obtained for one sampling period, it is enough to provide one multiplier group.

Four kinds of multiplication results each having an amount of 256 taps generated from the code multiplying unit 54 are inputted to the code adding unit 55. As mentioned above, since the code multiplying unit 54 alternately generates one of the four kinds of multiplication results one kind by one at a speed of 64 MHz, one set of the constitution in the code adding unit of FIG. 9 is provided in the code adding unit 55. The unit 55 generates 16 addition results at a speed of 64 MHz. The addition processing of the code adding unit 55 is the same as those of the code adding units in the MFs of FIGS. 1 to 4.

Four kinds of addition results (16 results every kind) generated from the code adding unit 55 are inputted to a complex operating unit 59 to perform the complex operation.

Performing the complex operation needs four kinds of combinations of the products of reception data and spreading codes. As mentioned above, since completing all of the combinations requires the elapse of one sampling period, the complex operating unit 59 generates 16 combinations of the I-component and Q-component complex operation results at a speed of 16 MHz.

Accordingly, the complex operating unit 59 needs to have such a construction that the addition results generated from the code adding unit 55 are temporarily stored by using, for example, a memory and the operation is performed at point of time when the addition results necessary for the complex operation are completed. To execute the above-mentioned operation by the complex operating unit 59, a speed for the storage and operation of the addition results is 64 MHz.

The 16 combinations of I-component and Q-component operation results generated from the complex operating unit 59 are supplied to a signature multiplying unit 57. From that time forward, the demodulation processing with a plurality of signatures and correlation outputs are performed at a speed of 64 Mbps. Since the constitutions and operations of signature registers 56-1 to 56-4, signature multiplying unit 57, and signature adding unit 58 are the same as those of the corresponding units in the MF of FIG. 4, the description is omitted.

In the MF of FIG. 5, the combination of the signature registers, signature multiplying unit, and signature adding unit can be also arranged in parallel in accordance with the number of kinds of signatures. It is preferable to make the processing speed of each unit of the combination correspond to the number of kinds of signatures included in the combination of units.

In the MF of FIG. 5, the I-component code register 53-1 and Q-component register 53-2 are alternately switched to generate the code to the code multiplying unit 54 at a speed of 64 MHz and the processing speed of the code multiplying unit 54 is set to 64 MHz, so that two multiplier groups can be reduced by one group in the code multiplying unit 54, the number of multipliers can be reduced by 256, and the number of adders can be reduced by (15×16=) 240 in the code register adding unit 55.

According to the embodiment 5 of the present invention, the MF has such a constitution that the processing speed of each of the code register 53 and code multiplying unit 54 is raised and the demodulation processing is performed in a time-division manner, so that there are such effects that the number of multipliers and that of adders used in the code multiplying unit 54 and code adding unit 53 can be reduced, the circuit scale of the MF circuit can be further reduced, and the circuit scale of the RACH receiving apparatus can be reduced.

Figure 6:
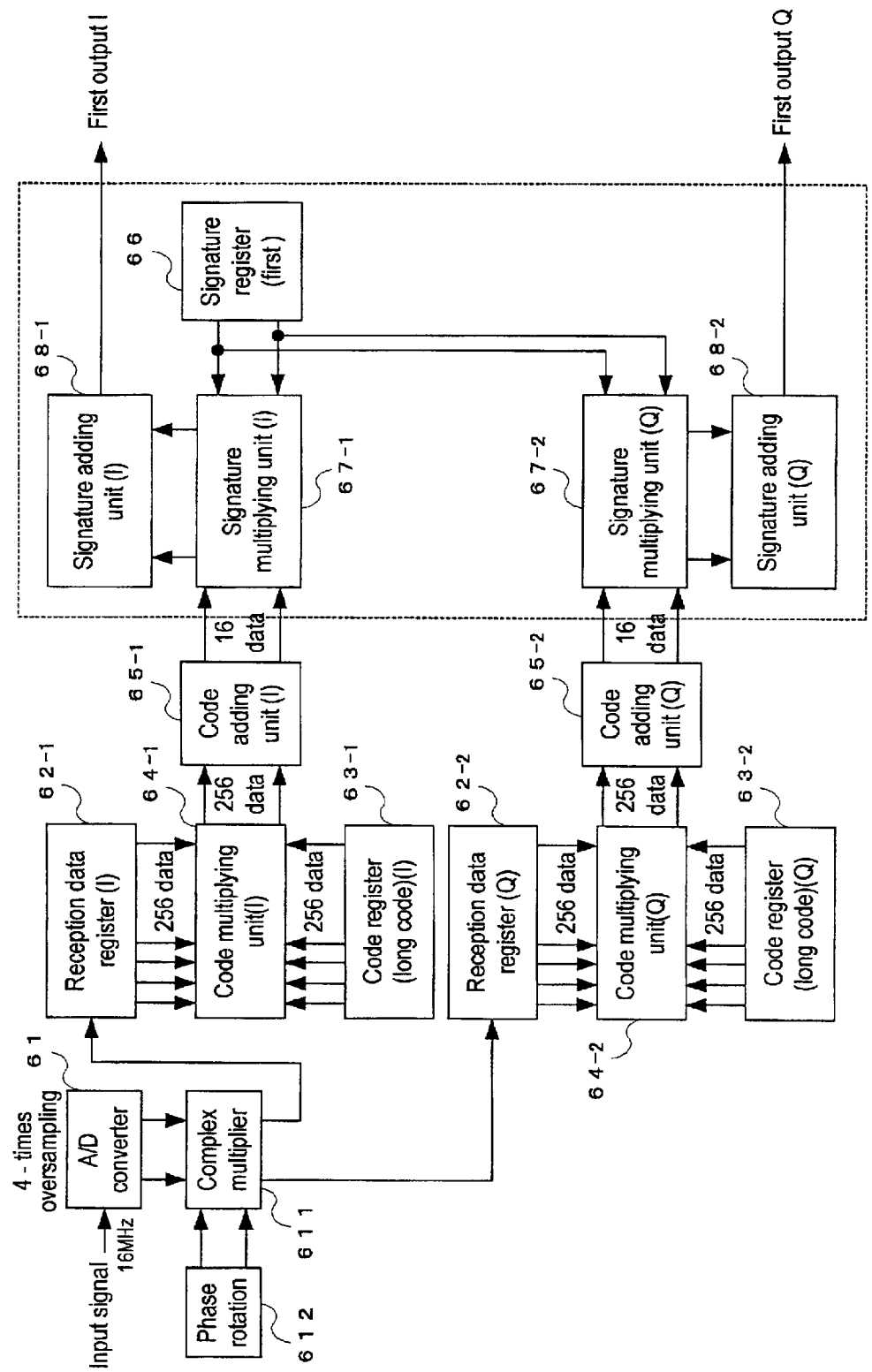
FIG. 6 is a block diagram of a demodulating unit of an RACH receiving apparatus according to a sixth embodiment of the present invention.

FIG. 6 is a block diagram of a demodulating unit (MF) according to a sixth embodiment of the present invention. The constitution and operation of the MF according to the sixth embodiment (hereinbelow, referred to as an embodiment 6) of the present invention will now be described hereinbelow with reference to FIG. 6 with emphasis on a difference between the present MF and those of FIGS. 1 to 5.

The MF of FIG. 6 first performs the phase rotation and complex operation processing to reception data, performs a demodulation processing with the long codes and a demodulation processing with the signatures to the complex operation results, and obtains correlation outputs. The MF of FIG. 6 obtains the correlation outputs by using one kind of signature code.

In the MF of FIG. 6, I-component and Q-component reception data converted by an A/D converter are first supplied to a complex multiplier 611. I-component and Q-component phase rotation codes stored in a phase rotation register 612 are also outputted to the complex multiplier 611. The complex multiplier 611 performs the complex operations of them to generate complex operation results of the respective components.

Figure 10A:
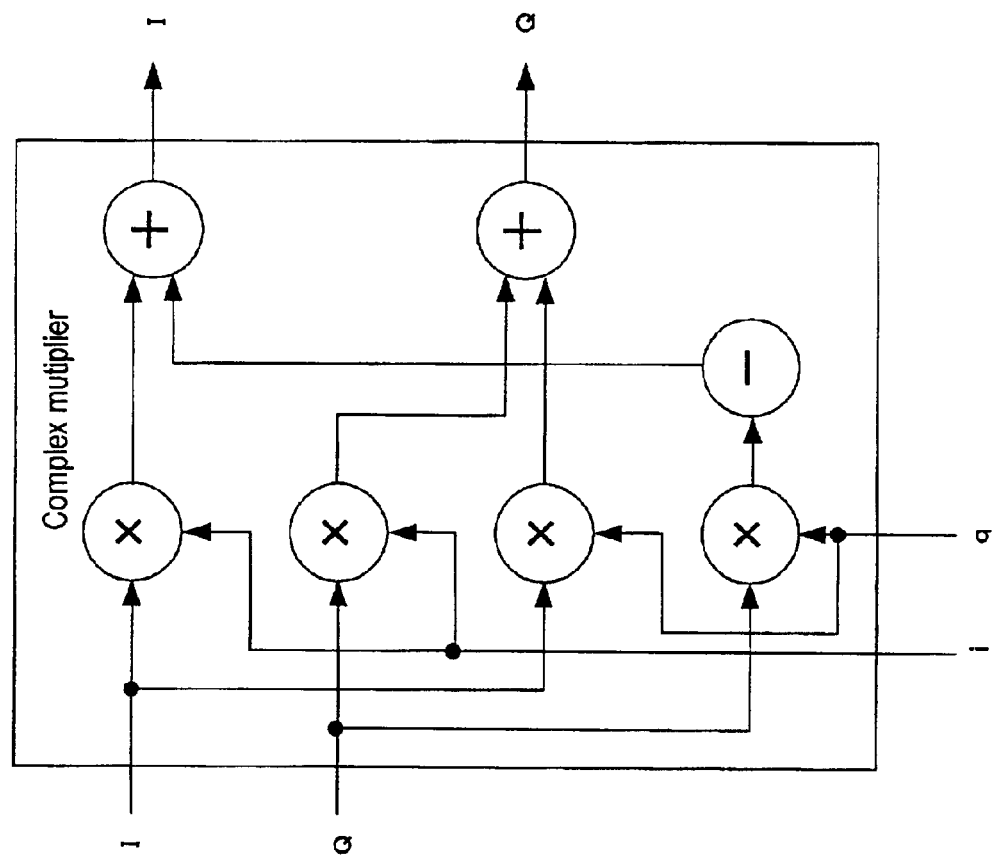
FIG. 10 is a block diagram of a complex multiplier in a matched filter according to the six th embodiment of the present invent ion.
Figure 10B:
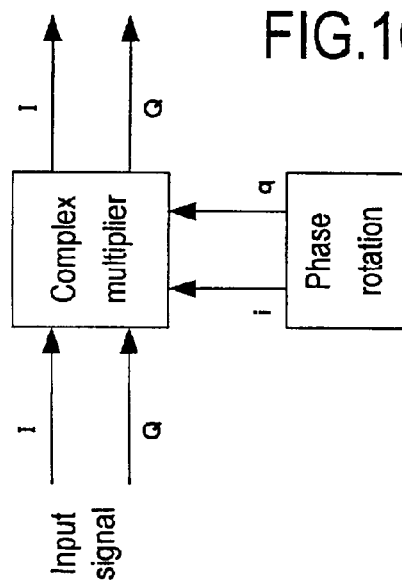
Figure 11:
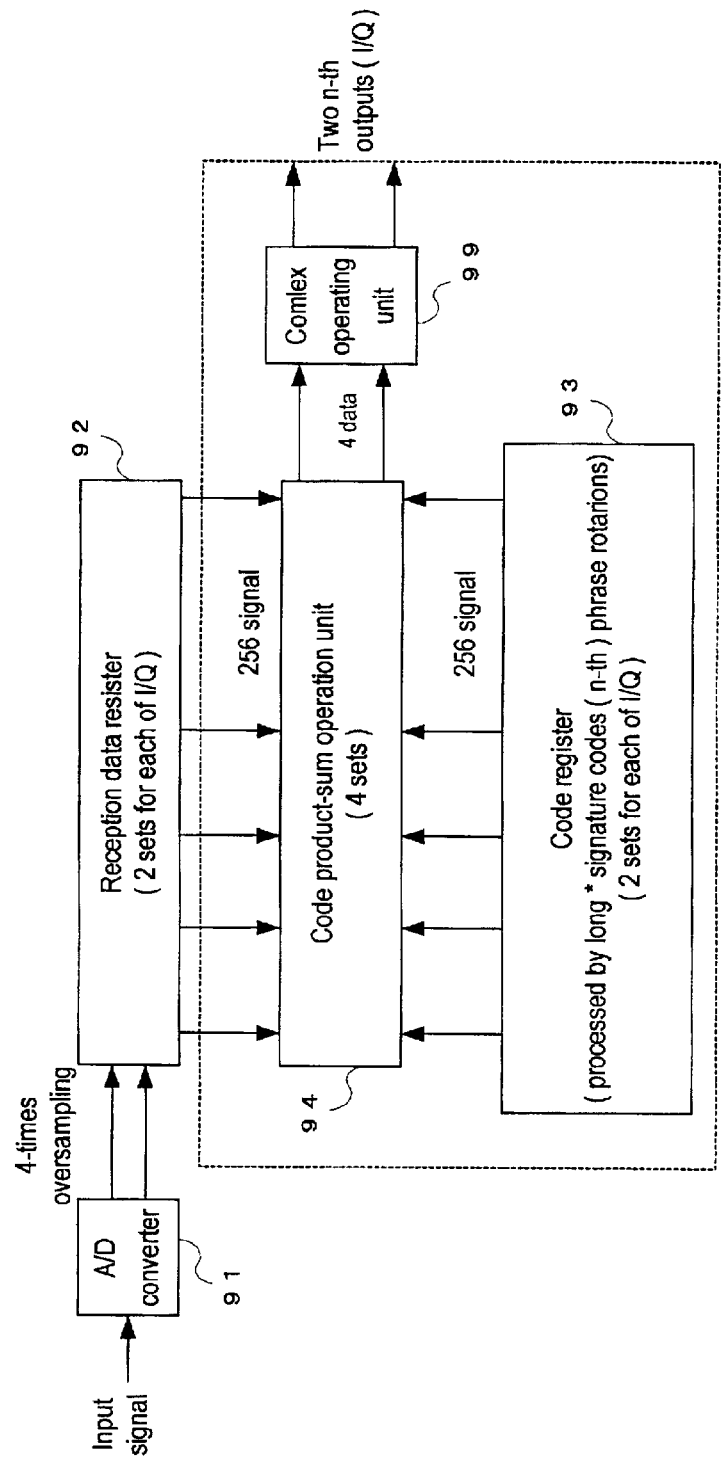
FIG. 11 is a block diagram of a demodulating unit of a conventional RACH receiving apparatus.

FIG. 10 is a block diagram of the complex multiplier 611. In the block diagram of FIG. 10, reference signs I and Q denote I-component and Q-component reception data and reference signs i and q denote I-component and Q-component phase rotation codes, respectively.

The circuit constitution of the complex multiplier 611 shown in FIG. 10 is nothing less than a circuit for realizing the complex operating equations (1) and (2). Accordingly, the complex multiplier 611 performs a phase rotating process and, simultaneously, performs a complex operation processing of reception data.

Among the complex operation results of the respective components generated from the complex multiplier 611, the I-component complex operation results are outputted to a reception data register 62-1 and the Q-component complex operation results are generated to a reception data register 62-2, respectively.

From that time forward, a code register multiplying unit 64-1 tap-multiplies the I-component complex operation results by I-component long codes stored in a code register 63-1 and, further, a code register adding unit 65-1 adds the multiplication results every 16 chips, so that the demodulation processing with the long codes is completed and 16 addition results are outputted. The Q-component complex operation results are also subjected to the demodulation processing with the long codes by the corresponding units.

In the MF of FIG. 6, each of the reception data registers 62-1 and 62-2, code registers 63-1 and 63-2, code multiplying units 64-1 and 64-2, and code adding units 65-1 and 65-2 has the constitution comprising one circuit group, namely, F/F row, multiplier group, or adder group of the corresponding unit of the MF of FIG. 1. Since reception data has already been subjected to the complex operation processing and it is sufficient to perform the demodulation processing with the long codes to the complex operation results of each component, one circuit group is enough for each unit.

The addition results of the respective components (16 results every component) generated from the code adding units 65-1 and 65-2 are outputted to signature multiplying units 67-1 and 67-2, respectively. The signature multiplying unit 67-1 multiplies the I-component addition results of the complex operation results by signature codes stored in a signature register 66. A signature adding unit 68-1 obtains the total sum of the multiplication results and generates the result as an I-component correlation output. The similar steps in the corresponding units also process the addition results of the Q-component complex operation results. A signature adding unit 68-2 generates the result as a Q-component correlation output.

In the MF of FIG. 6, each of the signature multiplying unit 67 and the signature adding unit 68 has one set of circuit group, namely, a group of multipliers or adders included in the corresponding unit in the MF of FIG. 1.

The respective units constituting the MF of FIG. 6 are operated at a speed of 16 MHz. In the MF of FIG. 6, it is necessary to provide the signature register 66, signature multiplying units 67-1 and 67-2, and signature adding units 68-1 and 68-2 as much as the number of kinds of signature codes used during the modulation.

In the MF of FIG. 6, the complex multiplier 611 first performs the phase rotation processing and complex operation processing to the I-component and Q-component reception data and, after that, performs the demodulation processing with the long codes and demodulation processing with the signatures to the obtained complex operation results of the respective components. Consequently, as compared with the MF of FIG. 2, the four groups of multipliers are reduced to two groups in the code multiplying unit 64, namely, the number of multipliers can be reduced by 512, the adders can be reduced by (15×16×2=) 480 in the code adding unit 65, the multipliers can be reduced by (16×2=) 32 in the signature multiplying unit 67, and the adders can be reduced by (15×2=) 30 in the signature adding unit 68. When the number of kinds of signatures is set to n, the total number of adders used in the MF of FIG. 6 is expressed as (482+30×n).

According to the embodiment 6 of the present invention, the MF has such a constitution that after the phase rotation processing and complex operation processing are performed to the reception data, the demodulation processing with the long codes and demodulation processing with the signatures are performed, so that the number of multipliers and that of adders used in the whole MF can be reduced. Consequently, there are such effects that the circuit scale of the MF circuit can be reduced and the circuit scale of the RACH receiving apparatus can be reduced. Since the MF circuit scale can be reduced at the same operation speed as the conventional one, there is such an effect that the power consumption can be reduced.

In the MF of FIG. 6, as described in the MFs of FIGS. 3 and 4, the constitutions of the respective units and the processing speed can be modified to perform the demodulation processing with the long codes and the demodulation processing with the signatures in a time-division manner.

Figure 7:
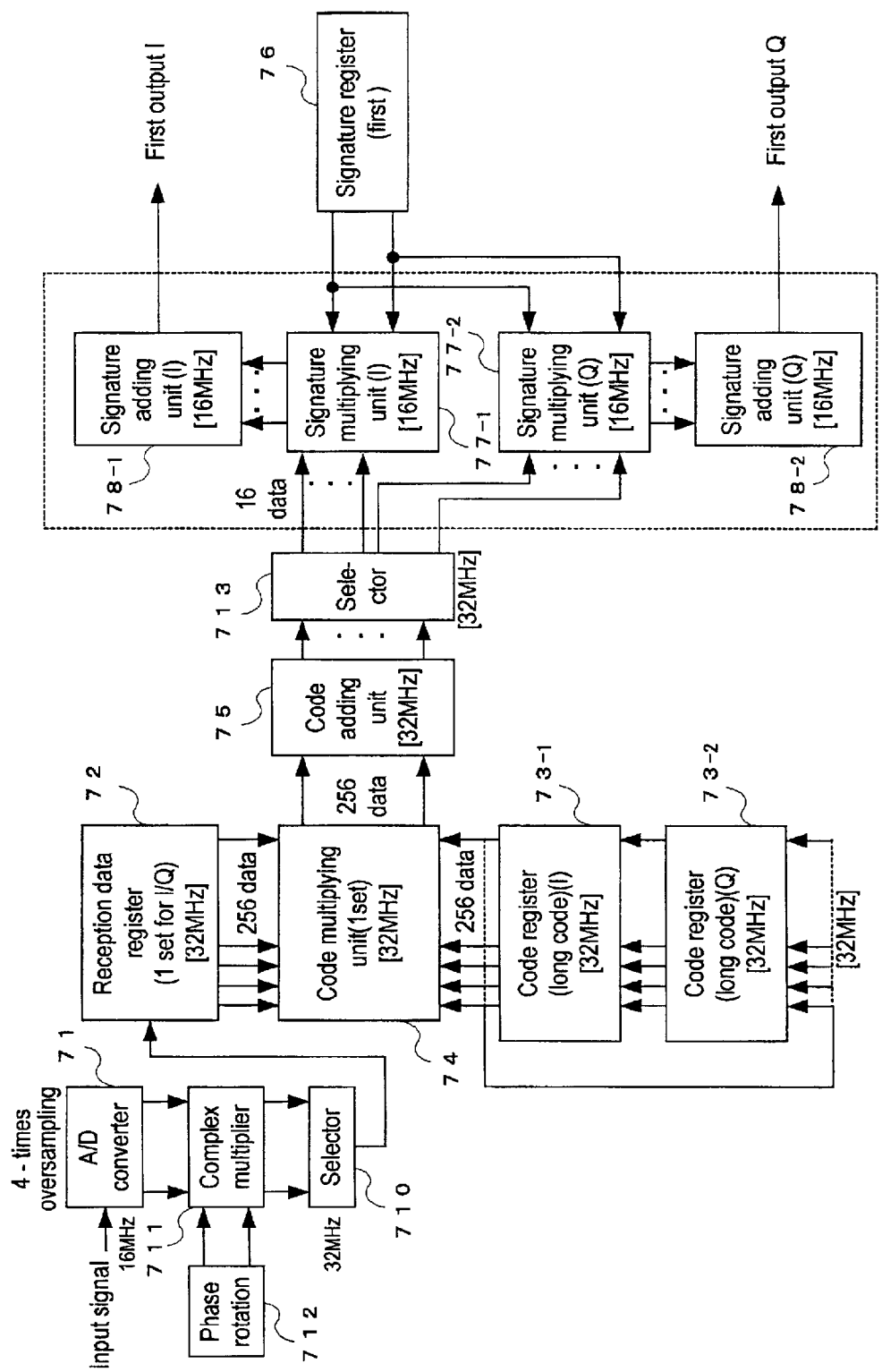
FIG. 7 is a block diagram of a demodulating unit of an RACH receiving apparatus according to a seventh embodiment of the present invention.

FIG. 7 is a block diagram of a demodulating unit (MF) according to a seventh embodiment of the present invention. Similar to the case of FIG. 3, the MF of FIG. 7 has such a constitution that the processing speed of each of the units for performing the demodulation processing with the long codes is raised and the demodulation processing is performed in a time-division manner.

Referring to FIG. 7, a reception data register 72 has the same constitution as that of the reception data register in FIG. 3. That is, the register comprises serially connected F/Fs of 2048 taps and has output terminals in the F/Fs every eight taps. The reception data register 72 tap-outputs complex operation results from the output terminals to a code multiplying unit 74 at a speed of 32 MHz.

As code registers, there are provided an I-component code register 73-1 for storing I-component long codes and a Q-component code register 73-2 for storing Q-component long codes. The registers are alternately switched to generate the stored long code to the code multiplying unit 74 at a speed of 32 MHz. Each of the I-component code register 73-1 and Q-component code register 73-2 comprises F/Fs of 256 taps.

Although the code multiplying unit 74 has the same constitution as that of each of the code multiplying units 64-1 and 64-2 in FIG. 6 and a code adding unit 75 has the same constitution as that of each of the code adding units 65-1 and 65-2, they perform the operation processing at a speed of 32 MHz. A selector 713 generates 16 addition results outputted from the code adding unit 75 to signature multiplying units 77-1 and 77-2 so as to switch them at a speed of 32 MHz. The other units have the same constitutions as those in FIG. 6.

As for the operation in FIG. 7, I-component and Q-component complex operation results outputted from a complex multiplier 711 are alternately switched by a selector 710 at a speed of 32 MHz and then generated to the reception data register 72.

The reception data register 72 stores the complex operation results generated from the selector 710, sequentially shifts them, and tap-outputs the complex operation results to the code multiplying unit 74 at a speed of 32 MHz.

The I-component code register 73-1 and Q-component code register 73-2 alternately generate the long codes of the respective components at a speed of 32 MHz. Accordingly, the code multiplying unit 74 performs the multiplication of the complex reception result and long code of the same component every ½ sampling period. In this instance, the reception data register 72 and code registers 73-1 and 73-2 need to synchronize the output timings of the respective data with each other so as to perform the multiplication of the complex operation result and long code of the same component in the code multiplying unit 74.

The code multiplying unit 74 multiplies the reception data by the I-component and Q-component long codes stored in the code registers 73. Further, the code adding unit 75 adds the multiplication results in the code multiplying unit 75 every 16 chips to output 16 addition results. Since the detailed operations of the code multiplying unit 74 and the code adding unit 75 are the same as those of the preceding embodiment, the description is omitted.

The I-component and Q-component addition results are alternately generated from the code adding unit 75 to the selector 713 at a speed of 32 MHz. The selector 713 generates the addition results of the respective components to corresponding signature multiplying units so as to switch them. In other words, when the I-component addition result is generated, the selector generates it to the signature multiplying unit 77-1 and, when the Q-component addition result is generated, the selector generates it to the signature multiplying unit 77-2. The selector 713 switches the generating destination at a speed of 32 MHz.

The addition results of the respective components generated to the signature multiplying units 77-1 and 77-2 are multiplied by the signature codes and the obtained results are added in a manner similar to the MF of FIG. 6, thereby outputting the correlation outputs of the respective components.

In the MF of FIG. 7, the processing speed of the unit for performing the demodulation processing with the long codes is doubled, so that the power consumption of the unit whose processing speed is raised is twice as high as that in the MF of FIG. 2. On the other hand, as for the circuit scale, as compared with the MF of FIG. 6, the two multiplier groups are reduced to one group in the code multiplying unit 74, namely, the number of multipliers can be reduced by 256, and the number of adders can be reduced by (15×16=) 240 in the code adding unit 75. The total number of adders used in the MF of FIG. 7 is expressed as (242+30×n).

According to the embodiment 7 of the present invention, the MF has such a constitution that the processing speed of the units for performing the demodulation processing with the long codes is raised and the demodulation processing is performed in a time-division manner, so that the number of multipliers and that of adders in the units for performing the demodulation processing with the long codes can be reduced. Accordingly, there are such effects that the circuit scale of the MF circuit can be further reduced and the circuit scale of the RACH receiving apparatus can be reduced.

Figure 8:
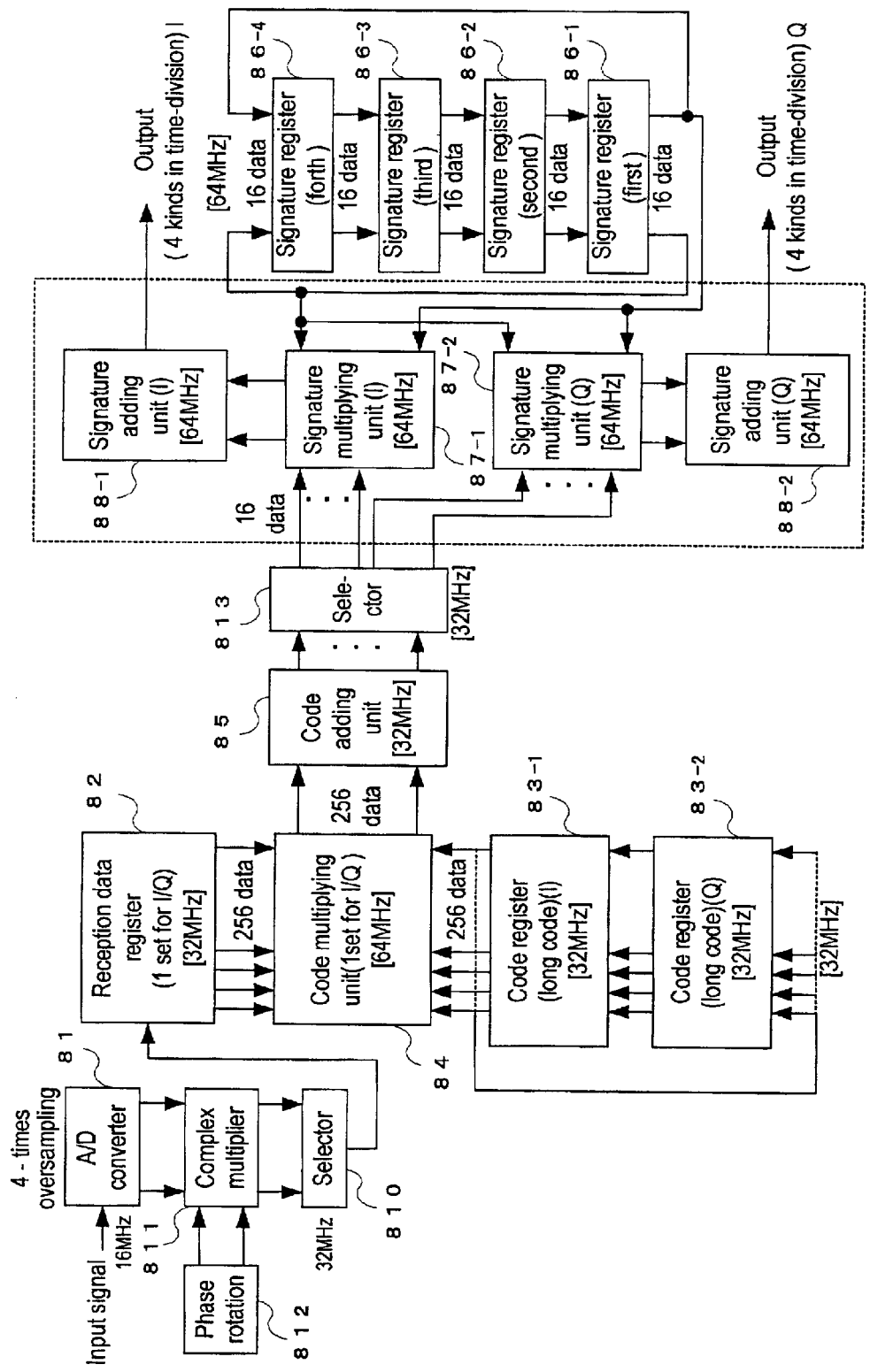
FIG. 8 is a block diagram of a demodulating unit of an RACH receiving apparatus according to an eighth embodiment of the present invention.

FIG. 8 is a block diagram of a demodulating unit (MF) according to an eighth embodiment of the present invention. The MF of FIG. 8 is a modification of the MF according to the embodiment 7 of the present invention, in which the processing speed of the units for performing the demodulation processing with the four kinds of signatures is raised and the demodulation processing is performed in a time-division manner.

In the MF of FIG. 8, since the constitutions and operations of units from an A/D converter 81 up to a selector 813 are the same as the corresponding units in the MF of FIG. 7, the description is omitted.

I-component and Q-component addition results generated from the selector 813 are inputted to signature multiplying units 87-1 and 87-2. The constitution and operation of each of the signature multiplying units 87-1 and 87-2 are the same as those of the signature multiplying unit 77 in FIG. 7, the processing speed is set to 64 MHz that is four times as high as that of the unit 77.

Signature registers 86-1 to 86-4 are switched to generate signature codes stored therein to the signature multiplying units 87-1 to 87-2 in a time-division manner at a speed of 64 MHz. The signature registers 86-1 to 86-4 perform the above-mentioned operation in a circulating manner.

Accordingly, the signature multiplying units 87 multiply the same complex operation result by different signature codes at a speed of 64 MHz, respectively, thereby performing the demodulation processing with a plurality of signatures in one multiplying unit.

As for multiplication results of the I-component and Q-component (16 results every component) generated from the signature multiplying units 87-1 and 87-2, the total sums of the respective components are calculated by signature adding units 88-1 and 88-2 and generated as correlation outputs. The construction and operation of the signature adding unit 88 are the same as those of the signature adding unit 78 in FIG. 7. Since the processing speed is equal to 64 MHz, however, the correlation outputs can be generated every kind of signature.

In the MF of FIG. 8, the processing speed of the unit for performing the demodulation processing with the signatures are increased by times corresponding to the number of kinds of signatures, so that the setting number of signature multiplying units 87 and signature adding units 88 can be reduced.

In the MF of FIG. 8, since one combination of the signature multiplying unit 87 and the signature adding unit 88 deal with the demodulation processing with four kinds of signatures, the number of multipliers can be reduced by (16×2×3=) 96 and the number of adders can be reduced by (15×2×3=) 90 as compared with the case of using the four kinds of signatures in the MF of FIG. 7.

In the MF according to the embodiment 8 of the present invention, the combination of the signature register, signature multiplying unit, and signature adding unit can also be arranged in parallel in accordance with the number of kinds of signatures. It is preferable to make the processing speed of the units of such a combination correspond to the number of kinds of signatures included in the combination of units.

According to the embodiment 8 of the present demodulation processing with four kinds of signatures invention, the MF has such a constitution that the processing speed of the units for performing the demodulation processing with the signatures is increased by times corresponding to the number of kinds of the signatures and the demodulation processing with a plurality of signatures is performed in a time-division manner, so that there are such effects that the number of multipliers and that of adders in the units for performing the demodulation processing with the signatures can be reduced, the circuit scale of the MF circuit can be further reduced, and the circuit scale of the RACH receiving apparatus can be reduced.

In the MF of FIG. 6, as compared with the MF of FIG. 2 having the same processing speed, the number of multipliers and that of adders can be reduced. Accordingly, as shown in FIGS. 7 and 8, when the MF is constructed so as to perform the time-division processing described in FIGS. 3 and 4, it is clear that the number of multipliers and that of adders can be further reduced as compared with the MFs of FIGS. 3 and 4.

The demodulating unit (MF) of the RACH receiving apparatus according to the invention has such effects that the circuit scale of the MF can be reduced as compared with the conventional one, so that the price of an LSI used for the MF circuit can be reduced.

As for the MF of the present invention, the embodiments 3 to 5 have described with respect to the MF in which the processing speed of the units constituting the MF is raised and the time-division processing is performed. In the present CMOS, since a processing speed of 100 Mbps is realized, the MF can be embodied without problems in future.

According to the present invention, in the RACH receiving apparatus for demodulating a reception signal spread-spectrum by the long codes, phase rotation information, and signatures, the first multiplying unit multiplies the reception signal by first despreading codes operated by the long codes and phase rotation information, the first adding unit adds a plurality of multiplication results generated from the first multiplying unit at specific intervals, the second multiplying unit multiplies a plurality of addition results generated from the first adding unit by second despreading codes of the signatures, and the second adding unit adds multiplication results generated from the second multiplying unit to obtain the correlation outputs. Accordingly, the demodulation processing using the first despreading codes and the demodulation processing using the second despreading codes are performed so as to be divided into two stages, thereby reducing the total number of adders. Consequently, there are such an effect that it is possible to reduce the circuit scale and the power consumption.

According to the present invention, in the above RACH receiving apparatus, since it includes the complex operating unit for performing the complex operation to the correlation outputs generated from the second adding unit, there are such effects that the complex-modulated reception signal can be demodulated and the correct correlation outputs can be obtained.

According to the present invention, in the above RACH receiving apparatus, since the complex operating unit for performing the complex operation to the reception signal is provided between the first adding unit and the second multiplying unit, there are such effects that the circuit scale can be further reduced and the power consumption can be reduced.

According to the present invention, in the RACH receiving apparatus for demodulating a reception signal spread-spectrum by the long codes, phase rotation information, and signatures, the complex operation processing unit performs the complex operation processing to the reception signal, the first multiplying unit multiplies the in-phase component and the quadrature component in the complex operation results by the first despreading codes of the long codes, the first adding unit adds a plurality of multiplication results of the in-phase component and quadrature component generated from the first multiplying units at specific intervals, the second multiplying unit multiplies a plurality of addition results generated from the first adding unit by the second despreading codes of the signatures, and the second adding units adds the multiplication results generated from the second multiplying unit to obtain the correlation outputs. There are such effects that the circuit scale can be reduced and the power consumption can be reduced.

According to the present invention, in the above RACH receiving apparatus, since the first multiplying unit multiplies the in-phase component and quadrature component in the reception signal by the first despreading codes in a time-division manner at a speed that is integer times as high as a sampling speed of an input signal and the first adding unit performs the addition at the above speed of the integer times, the apparatus has the effects that the circuit scale can be further reduced by raising the speed of the demodulation processing with the first despreading codes.

According to the present invention, in the above RACH receiving apparatus, since the second multiplying unit multiplies the inputted operation results by the second despreading codes at a speed increased by times corresponding to the number of kinds of the second despreading codes and the second adding unit performs the addition at the speed increased by times corresponding to the number of kinds of the second despreading codes, the apparatus has the effects that the number of multipliers and that of adders performing the demodulation processing with the second despreading codes can be reduced and the circuit scale can be reduced.

According to the present invention, in the above RACH receiving apparatus, since the first multiplying unit performs the multiplication of the in-phase component and quadrature component in the reception signal by the first despreading codes in such a time-division manner that the capture timing of the I component and Q component is set to a speed that is integer times as high as the sampling speed of the input signal and, on the other hand, the capture timing of the first despreading code is set to a speed that is twice as high as the speed, and the first adding unit performs the addition at the speed that is twice as the integer-times speed, the apparatus has the effects that the number of multipliers and that of adders for performing the demodulation processing with the first despreading codes can be reduced and the circuit scale can be reduced.

What is claimed is:

1. A Random Access Channel receiving apparatus for demodulating a reception signal spread-spectrum by long codes, phase rotation information, and signatures, the apparatus comprising:
   a first multiplying unit for multiplying said reception signal by first despreading codes operated by the long codes and phase rotation information;
   a first adding unit for adding at specific intervals a plurality of multiplication results outputted from said first multiplying unit;
   a second multiplying unit for multiplying a plurality of addition results outputted from said first adding unit by second despreading codes of the signatures; and
   a second adding unit for adding multiplication results outputted from said second multiplying unit to obtain correlation outputs.

2. The apparatus according to claim 1, comprising a complex operating unit for performing a complex operation to the correlation outputs generated from the second adding unit.

3. The apparatus according to claim 1, wherein a complex operating unit for performing a complex operation to the reception signal is provided between the first adding unit and the second multiplying unit.

4. A Random Access Channel receiving apparatus for demodulating a reception signal spread-spectrum by long codes, phase rotation information, and signatures, the apparatus comprising:
   a complex operation processing unit for performing a complex operation processing to the reception signal;
   a first multiplying unit for multiplying an in-phase component and a quadrature component in said complex operation result by first despreading codes of the long codes;
   a first adding unit adding at specific intervals a plurality of multiplication results of the in-phase component and the quadrature component outputted from said first multiplying unit;
   a second multiplying unit for multiplying a plurality of addition results outputted from said first adding unit by second despreading codes of the signatures; and
   a second adding unit for adding multiplication results outputted from the second multiplying unit to obtain correlation outputs.

5. The apparatus according to claim 3, wherein said first multiplying unit multiplies the in-phase component and the quadrature component in the reception signal by the first despreading codes in a time-division manner at a speed that is integer times as high as a sampling speed of an input signal, and the first adding unit performs the addition at said integer-times speed.

6. The apparatus according to claim 4, wherein the first multiplying unit multiplies the in-phase component and the quadrature component in the reception signal by the first despreading codes in a time-division manner at a speed that is integer times as high as a sampling speed of an input signal, and the first adding unit performs the addition at said integer-times speed.

7. The apparatus according to claim 5, wherein the second multiplying unit performs the multiplication of the inputted operation results and the second despreading codes at a speed increased by times corresponding to the number of kinds of the second despreading codes and the second adding unit performs the addition at the speed increased by times corresponding to the number of kinds of the second despreading codes.

8. The apparatus according to claim 6, wherein the second multiplying unit performs the multiplication of the inputted operation results and the second despreading codes at a speed increased by times corresponding to the number of kinds of the second despreading codes and the second adding unit performs the addition at the speed increased by times corresponding to the number of kinds of the second despreading codes.

9. The apparatus according to claim 7, wherein the first multiplying unit performs the multiplication of the in-phase component and the quadrature component in the reception signal and the first despreading codes in such a time-division manner that capture timing of the in-phase component and the quadrature component is set to a speed that is integer times as high as a sampling speed of an input signal and, on the other hand, capture timing of the first despreading code is set to a speed that is twice as high as the speed, and the first adding unit performs the addition at the speed that is twice as high as the integer-times speed.

* * * * *